(12) United States Patent
Huang et al.

(10) Patent No.: US 10,779,222 B2
(45) Date of Patent: Sep. 15, 2020

(54) GRANT-FREE ADMISSION CONTROL TO A SHARED CHANNEL

(71) Applicant: QUALCOMM Incorporated, San Diego, CA (US)

(72) Inventors: Yi Huang, San Diego, CA (US); Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 15/895,388

(22) Filed: Feb. 13, 2018

(65) Prior Publication Data

US 2018/0324676 A1 Nov. 8, 2018

Related U.S. Application Data

(60) Provisional application No. 62/501,641, filed on May 4, 2017.

(51) Int. Cl.
*H04W 48/06* (2009.01)
*H04W 74/08* (2009.01)
(Continued)

(52) U.S. Cl.
CPC .......... *H04W 48/06* (2013.01); *H04W 24/02* (2013.01); *H04W 72/042* (2013.01);
(Continued)

(58) Field of Classification Search
CPC ... H04W 48/06; H04W 74/006; H04W 24/02; H04W 72/10; H04W 72/042;
(Continued)

(56) References Cited

U.S. PATENT DOCUMENTS

| 10,004,031 | B2 * | 6/2018 | Seok | H04W 74/0816 |
| 2009/0046672 | A1 * | 2/2009 | Malladi | H04L 1/0067 370/336 |

(Continued)

FOREIGN PATENT DOCUMENTS

| EP | 3570612 A1 * | 12/2013 | ........ H04W 74/0866 |
| WO | WO-2015187860 A1 | 12/2015 | |
| WO | WO-2016168507 A1 | 10/2016 | |

OTHER PUBLICATIONS

International Search Report and Written Opinion—PCT/US2018/029376—ISA/EPO—dated Jul. 11, 2018 (174173WO).

*Primary Examiner* — Curtis A Alia
(74) *Attorney, Agent, or Firm* — Linda G. Gunderson; Holland & Hart LLP

(57) ABSTRACT

Methods, systems, and devices for wireless communication are described for grant-free admission control to a shared channel. A base station may select an admission control parameter from a set of admission control parameters, the selected admission control parameter setting a grant-free access threshold for determining eligibility to obtain grant-free access to resources of a shared channel. The base station may transmit the selected admission control parameter to configure a user equipment (UE) with the grant-free access threshold. A UE may receive an admission control parameter from the base station, and set a grant-free access threshold based at least in part on the admission control parameter. The UE may determine eligibility to obtain grant-free access to resources of a shared channel based at least in part on the grant-free access threshold, and communicate with the base station based at least in part on the determined eligibility.

28 Claims, 18 Drawing Sheets

(51) Int. Cl.
  *H04W 72/04* (2009.01)
  *H04W 72/10* (2009.01)
  *H04W 24/02* (2009.01)
  *H04W 76/27* (2018.01)
  *H04W 74/00* (2009.01)
  *H04W 88/08* (2009.01)
  *H04W 88/02* (2009.01)

(52) U.S. Cl.
  CPC ......... *H04W 72/10* (2013.01); *H04W 74/006* (2013.01); *H04W 74/0858* (2013.01); *H04W 76/27* (2018.02); *H04W 74/0808* (2013.01); *H04W 88/02* (2013.01); *H04W 88/08* (2013.01)

(58) Field of Classification Search
  CPC ............. H04W 74/0858; H04W 76/27; H04W 74/0808; H04W 88/02; H04W 88/08
  See application file for complete search history.

(56) References Cited

U.S. PATENT DOCUMENTS

| | | |
|---|---|---|
| 2015/0296370 A1 | 10/2015 | Kim et al. |
| 2016/0143014 A1* | 5/2016 | Mukherjee ........ H04W 74/0816 370/330 |
| 2016/0302231 A1* | 10/2016 | Chien ............... H04W 74/0816 |
| 2018/0035459 A1* | 2/2018 | Islam ................... H04L 5/0096 |

* cited by examiner

GRANT-FREE ADMISSION CONTROL TO A SHARED CHANNEL

CROSS REFERENCES

The present Application for Patent claims priority to U.S. Provisional Patent Application No. 62/501,641 by Huang, et al., entitled "Grant-Free Admission Control To A Shared Channel," filed May 4, 2017, assigned to the assignee hereof, the entirety of which is herein incorporated by reference.

BACKGROUND

The following relates generally to wireless communication, and more specifically to grant-free admission control to a shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A wireless multiple-access communication system may include a number of base stations, each simultaneously supporting communication with multiple UEs. A base station may communicate with UEs on downlink channels (e.g., for transmissions from a base station to a UE) and uplink channels (e.g., for transmissions from a UE to a base station). Some modes of communication may enable communication between a base station and a UE over a shared radio frequency spectrum band, or over different radio frequency spectrum bands (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (MNO) (or cellular operator) with opportunities for enhanced data transmission capacity. Use of a shared radio frequency spectrum band may also provide service in areas where access to a dedicated radio frequency spectrum band is unavailable.

SUMMARY

The described techniques relate to improved methods, systems, devices, or apparatuses that support grant-free admission control to a shared channel. Generally, the described techniques provide for setting a grant-free access threshold to enable a user equipment (UE) to determine its eligibility to transmit in a shared data channel. A base station may execute an admission control scheme and monitor data collisions to adjust the grant-free access threshold to control the eligibility of one or more UEs for grant-free access to the shared channel resources. A base station may select an admission control parameter from a set of admission control parameters to set the grant-free access threshold. The base station may transmit the selected admission control parameter to a UE in order to configure the UE with the grant-free access threshold. The UE may determine its eligibility to obtain grant-free access to resources of the shared channel based at least in part on the grant-free access threshold, and communicate with the base station based at least in part on its determined eligibility.

A method of wireless communication is described. The method may include selecting an admission control parameter from a plurality of admission control parameters, the selected admission control parameter setting a grant-free access threshold for determining eligibility to obtain grant-free access to resources of a shared channel, and transmitting the selected admission control parameter to configure a UE with the grant-free access threshold.

An apparatus for wireless communication is described. The apparatus may include means for selecting an admission control parameter from a plurality of admission control parameters, the selected admission control parameter setting a grant-free access threshold for determining eligibility to obtain grant-free access to resources of a shared channel, and means for transmitting the selected admission control parameter to configure a UE with the grant-free access threshold.

Another apparatus for wireless communication is described. The apparatus may include a processor, memory in electronic communication with the processor, and instructions stored in the memory. The instructions may be operable to cause the processor to select an admission control parameter from a plurality of admission control parameters, the selected admission control parameter setting a grant-free access threshold for determining eligibility to obtain grant-free access to resources of a shared channel, and transmit the selected admission control parameter to configure a UE with the grant-free access threshold.

A non-transitory computer readable medium for wireless communication is described. The non-transitory computer-readable medium may include instructions operable to cause a processor to select an admission control parameter from a plurality of admission control parameters, the selected admission control parameter setting a grant-free access threshold for determining eligibility to obtain grant-free access to resources of a shared channel, and transmit the selected admission control parameter to configure a UE with the grant-free access threshold.

In some examples of the method, apparatus, and non-transitory computer-readable medium described above, selecting the admission control parameter comprises detecting a collision rate within the resources of the shared channel, wherein the selected admission control parameter may be based at least in part on the detected collision rate.

In some examples of the method, apparatus, and non-transitory computer-readable medium described above, detecting the collision rate comprises determining a rate at which an energy level within the resources of the shared channel exceeds an energy threshold.

Some examples of the method, apparatus, and non-transitory computer-readable medium described above may further include processes, features, means, or instructions for detecting a collision rate within the resources of the shared channel. Some examples of the method, apparatus, and non-transitory computer-readable medium described above may further include processes, features, means, or instructions for adjusting the admission control parameter based at least in part on the detected collision rate. Some examples of the method, apparatus, and non-transitory computer-readable medium described above may further include processes, features, means, or instructions for transmitting the adjusted admission control parameter to configure the UE with the adjusted admission control parameter.

In some examples of the method, apparatus, and non-transitory computer-readable medium described above, the selected admission control parameter increases or decreases the grant-free access threshold. In some examples of the method, apparatus, and non-transitory computer-readable medium described above, the grant-free access threshold prevents the UE from accessing at least some of the resources of the shared channel. In some examples of the method, apparatus, and non-transitory computer-readable medium described above, the grant-free access threshold permits the UE to access at least some of the resources of the shared channel.

In some examples of the method, apparatus, and non-transitory computer-readable medium described above, transmitting the selected admission control parameter further comprises transmitting the selected admission control parameter on a common control channel. In some examples of the method, apparatus, and non-transitory computer-readable medium described above, the common control channel may be common to a group of UEs that includes the UE. In some examples of the method, apparatus, and non-transitory computer-readable medium described above, the selected admission control parameter configures each UE within the group of UEs with the grant-free access threshold.

In some examples of the method, apparatus, and non-transitory computer-readable medium described above, transmitting the selected admission control parameter further comprises transmitting the selected admission control parameter in a common control channel transporting a slot format indication or in a different common control channel. In some examples of the method, apparatus, and non-transitory computer-readable medium described above, transmitting the selected admission control parameter further comprises transmitting the selected admission control parameter in a control element. In some examples of the method, apparatus, and non-transitory computer-readable medium described above, transmitting the selected admission control parameter further comprises transmitting the selected admission control parameter using radio resource control signaling.

In some examples of the method, apparatus, and non-transitory computer-readable medium described above, the selected admission control parameter comprises at least one bit. In some examples of the method, apparatus, and non-transitory computer-readable medium described above, the plurality of admission control parameters correspond to a plurality of different access thresholds.

Some examples of the method, apparatus, and non-transitory computer-readable medium described above may further include processes, features, means, or instructions for selecting a priority level for the UE from a plurality of priority levels. Some examples of the method, apparatus, and non-transitory computer-readable medium described above may further include processes, features, means, or instructions for transmitting the selected priority level to the UE.

Some examples of the method, apparatus, and non-transitory computer-readable medium described above may further include processes, features, means, or instructions for determining a service level for the UE from a plurality of service levels. Some examples of the method, apparatus, and non-transitory computer-readable medium described above may further include processes, features, means, or instructions for transmitting the determined service level to the UE.

A method of wireless communication is described. The method may include receiving an admission control parameter from a base station, setting a grant-free access threshold based at least in part on the admission control parameter, determining eligibility to obtain grant-free access to resources of a shared channel based at least in part on the grant-free access threshold, and communicating with the base station based at least in part on the determined eligibility.

An apparatus for wireless communication is described. The apparatus may include means for receiving an admission control parameter from a base station, means for setting a grant-free access threshold based at least in part on the admission control parameter, means for determining eligibility to obtain grant-free access to resources of a shared channel based at least in part on the grant-free access threshold, and means for communicating with the base station based at least in part on the determined eligibility.

Another apparatus for wireless communication is described. The apparatus may include a processor, memory in electronic communication with the processor, and instructions stored in the memory. The instructions may be operable to cause the processor to receive an admission control parameter from a base station, set a grant-free access threshold based at least in part on the admission control parameter, determine eligibility to obtain grant-free access to resources of a shared channel based at least in part on the grant-free access threshold, and communicate with the base station based at least in part on the determined eligibility.

A non-transitory computer readable medium for wireless communication is described. The non-transitory computer-readable medium may include instructions operable to cause a processor to receive an admission control parameter from a base station, set a grant-free access threshold based at least in part on the admission control parameter, determine eligibility to obtain grant-free access to resources of a shared channel based at least in part on the grant-free access threshold, and communicate with the base station based at least in part on the determined eligibility.

In some examples of the method, apparatus, and non-transitory computer-readable medium described above, determining eligibility to obtain grant-free access to the resources of the shared channel comprises receiving a priority level of a plurality of priority levels from the base station. Some examples of the method, apparatus, and non-transitory computer-readable medium described above may further include processes, features, means, or instructions for comparing the priority level with the grant-free access threshold.

In some examples of the method, apparatus, and non-transitory computer-readable medium described above, determining eligibility to obtain grant-free access to the resources of the shared channel comprises determining a random number. Some examples of the method, apparatus, and non-transitory computer-readable medium described above may further include processes, features, means, or instructions for comparing the random number with the grant-free access threshold.

In some examples of the method, apparatus, and non-transitory computer-readable medium described above, determining the random number comprises determining a service level of a plurality of service levels. Some examples of the method, apparatus, and non-transitory computer-readable medium described above may further include processes, features, means, or instructions for generating the random number based at least in part on the determined service level.

DETAILED DESCRIPTION

Figure 1:
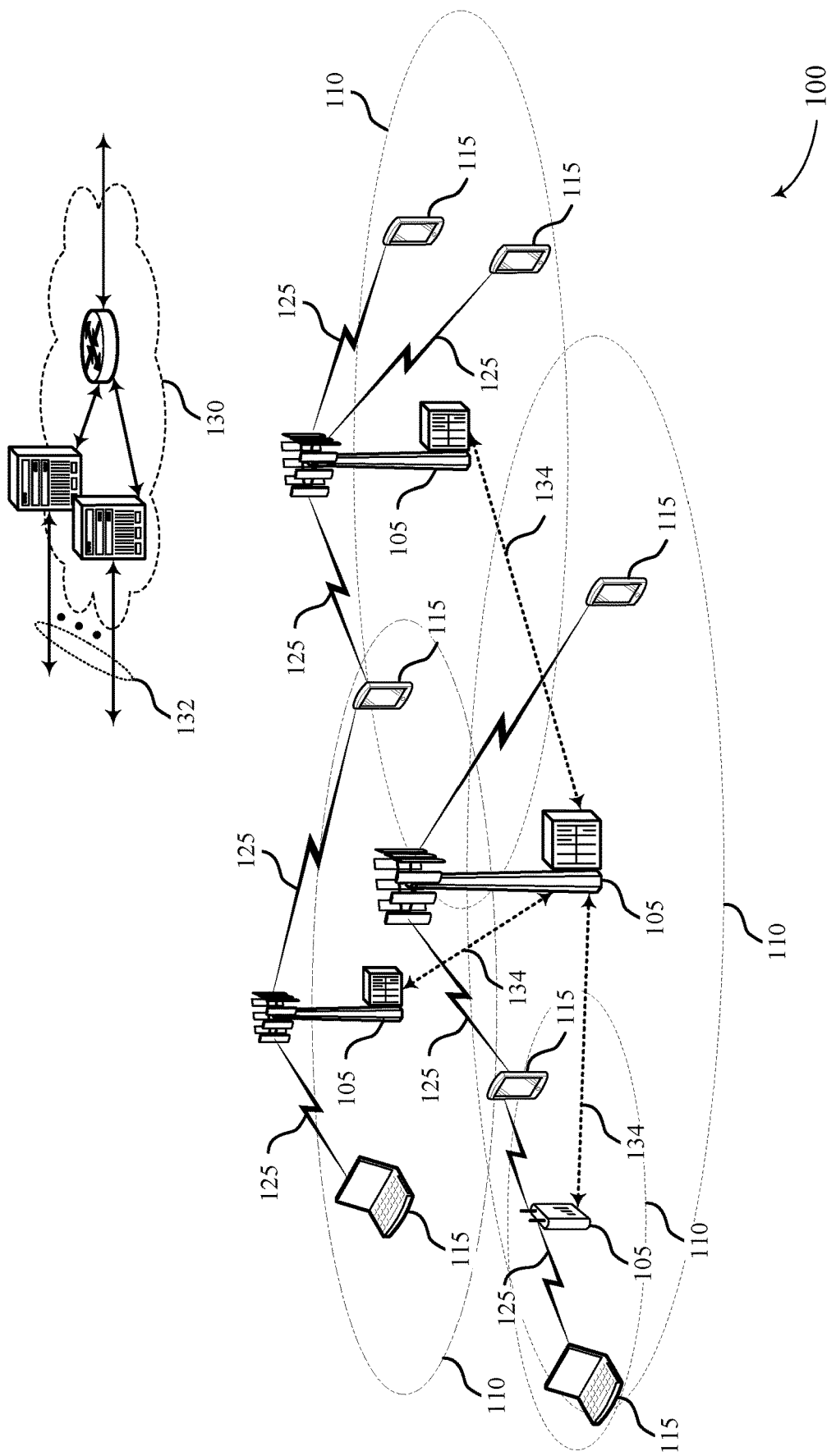
FIG. 1 illustrates an example of a system for wireless communication that supports grant-free admission control to a shared channel in accordance with aspects of the present disclosure.

The described techniques relate to improved methods, systems, devices, or apparatuses that support grant-free admission control to a shared channel. A mobile network operator (MNO) (or cellular operator) may use radio frequency spectrum shared by multiple user equipments (UEs) to enhance data transmission capacity. In some conventional techniques, a UE may identify data to transmit and perform a scheduling request (SR) procedure with a base station. In the SR procedure, the UE may request that the base station allocate time and frequency resources within a physical uplink shared channel (PUSCH) that the UE may use to send uplink transmissions. To initiate the SR procedure, the UE may transmit an SR asking the base station to allocate resources of the PUSCH to the UE. The base station may receive the SR and send a request to the UE, requesting that the UE generate a buffer status report (BSR) and/or a power headroom report (PHR). The BSR may indicate how much data the UE has buffered to send, and the PHR may indicate how much remaining transmission power the UE has to use in addition to any power the UE is using for other transmissions. The UE may send the BSR and the PHR to the base station. The base station may process the BSR and the PHR, and transmit an uplink (UL) grant to the UE allocating PUSCH resources to the UE. The UE may then transmit within the allocated PUSCH resources.

One problem with conventional techniques is that the SR procedure may take too long to complete, and may not satisfy latency requirements for low latency communication systems (e.g., ultra-reliable low latency communication (URLLC) systems). One conventional solution to this problem is to configure the UE with periodic PUSCH resources over time (e.g., in multiple subframes); when the UE has data to send, the UE may transmit within the periodic PUSCH resources without performing the SR procedure. Such a solution may be problematic as it may be wasteful of PUSCH resources, particularly when the UE only infrequently transmits data within the periodic PUSCH resources. Another conventional solution configures multiple UEs with the same periodic PUSCH resources and any of the UEs may transmit within the periodic PUSCH resources without performing the SR procedure. This solution is problematic as data collisions may frequently occur when multiple UEs attempt to transmit within the same PUSCH resources.

In contrast with such conventional solutions, the example admission control scheme described herein provides grant-free access to resources of an uplink shared channel. For example, a base station may monitor data collisions and adjust a grant-free access threshold to control which UEs are eligible for grant-free access to the shared channel resources.

Aspects of the disclosure are initially described in the context of a wireless communications system. The wireless communications system may select an admission control parameter that sets a grant-free access threshold for determining eligibility for grant-free access to resources of a shared uplink channel. Aspects of the disclosure are further illustrated by and described with reference to apparatus diagrams, system diagrams, and flowcharts that relate to grant-free admission control to a shared channel.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A base station 105 may select an admission control parameter from a set of admission control parameters, the selected admission control parameter setting a grant-free access threshold. The grant-free access threshold may govern eligibility of UEs to obtain grant-free access to resources of an uplink shared channel. In some cases, the base station 105 may monitor a collision rate within the resources of the uplink shared channel and adjust the admission control parameter to increase or decrease the grant-free access threshold. The base station 105 may transmit the selected admission control parameter to configure one or more UEs 115 with the grant-free access threshold. Each UE 115 may determine its eligibility to obtain grant-free access to resources of the uplink shared channel based at least in part on the grant-free access threshold, and may communicate with the base station 105 based at least in part on its determined eligibility.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The example admission control scheme described herein provides grant-free access to resources of an uplink shared channel. For example, a base station 105 may monitor data collisions and adjust a grant-free access threshold to control which UEs served by the base station 105 are eligible for grant-free access to the uplink shared channel resources.

Figure 2:
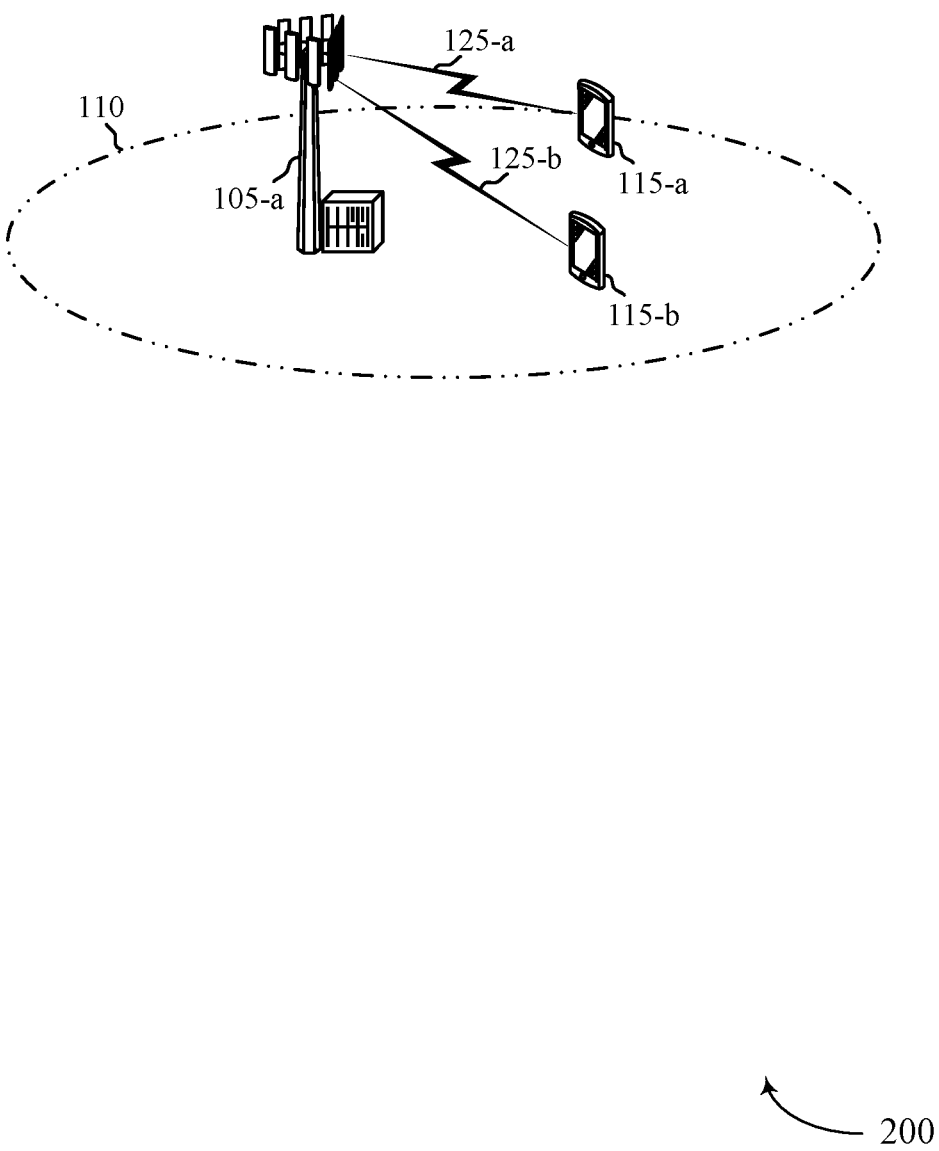
FIG. 2 illustrates an example of a wireless communications system that supports grant-free admission control to a shared channel in accordance with aspects of the present disclosure.

FIG. 2 illustrates an example of a wireless communications system 200 that supports grant-free admission control to a shared channel in accordance with various aspects of the present disclosure. In some examples, wireless communications system 200 may implement aspects of wireless communications system 100. Wireless communications system 200 includes base station 105-a and multiple UEs 115-a, 115-b, which may be examples of aspects of the corresponding devices as described above with reference to FIG. 1. In the example of FIG. 2, the wireless communications system 200 may operate according to a radio access technology (RAT) such as a LTE, 5G, or new radio (NR) RAT, although techniques described herein may be applied to any RAT and to systems that may concurrently use two or more different RATs.

UE 115-a may communicate with base station 105-a via communication link 125-a and UE 115-b may communicate with base station 105-a via communication link 125-n. As described in reference to FIG. 1, in some cases, base station 105-a may allocate TTIs that include time and frequency resources for uplink and downlink transmissions and communicate with the one or more UEs using the TTIs. In some cases, base station 105-a may transmit using mmW frequencies.

Figure 3:
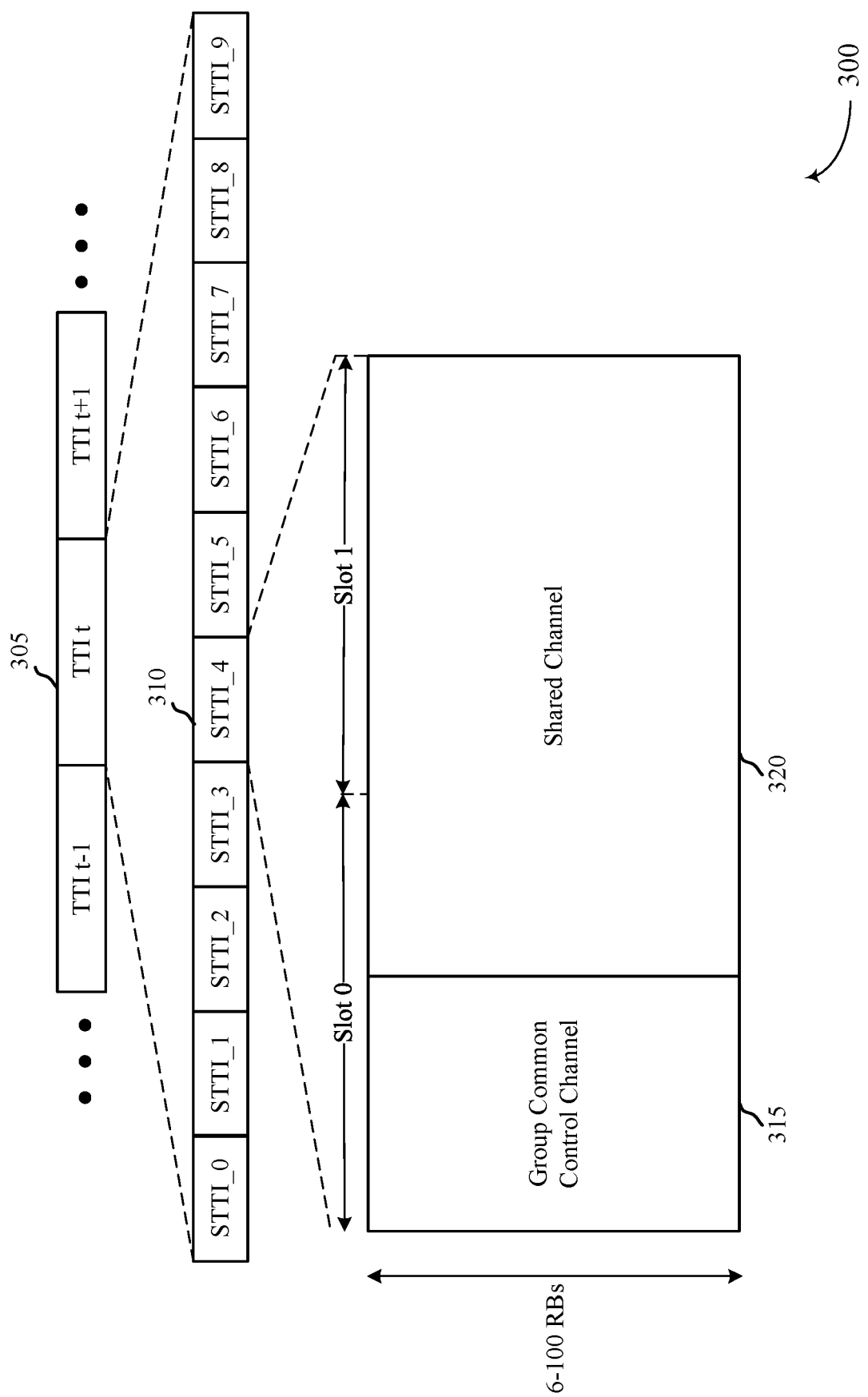
FIG. 3 illustrates an example of a transmission time interval (TTI) structure that supports grant-free admission control to a shared channel in accordance with aspects of the present disclosure.

FIG. 3 illustrates an example of a TTI structure 300 that supports grant-free admission control to a shared channel in accordance with various aspects of the present disclosure. A transmission timeline may be partitioned into units referred to herein as TTIs. Depicted are TTIs t−1, TTI t, and TTI t+1. Each TTI 305 may have a defined duration (e.g., 10 milliseconds (ms)) and may be partitioned into a defined number of sub TTIs 310 having corresponding indices (e.g., 10 sub TTIs with indices of 0 through 9). An example of a TTI is a frame having a 10 ms duration and an example of a sub TTI is a subframe having a 1 ms duration. A sub TTI 310 may be used for uplink communication or downlink communication. In uplink communication, a UE 115 transmits to a base station 105. In downlink communication, a base station 105 communicates to a UE 115. Each sub TTI 310 may include two slots and each slot may include L symbol periods, e.g., L=7 symbol periods for a normal cyclic prefix or L=6 symbol periods for an extended cyclic prefix. The 2L symbol periods in each sub TTI may be assigned indices of 0 through 2L−1.

The available time and frequency resources of each sub TTI 310 may be partitioned into resource blocks (RBs). In the depicted example, a sub TTI 310 includes 6 to 100 RBs. Each resource block may cover N subcarriers (e.g., 12 subcarriers) in one slot. A number of resource elements may be available in each symbol period. Each resource element (RE) may cover one subcarrier in one symbol period and may be used to send one modulation symbol. Resource elements not used for a reference signal in each symbol period may be arranged into resource element groups (REGs). Each REG may include four resource elements in one symbol period. In an example, slots of a sub TTI 310 may be partitioned into a group common control channel 315 and a shared channel 320.

The group common control channel 315 may correspond to a predetermined number of symbol periods of a pair of slots, and the shared channel 320 may correspond to a remainder of the symbol periods of the pair of slots. In an example, the group common control channel 315 may be a group common Physical Downlink Control Channel (PDCCH). The common control channel 315 may transport one or more grants that allocate some or all of resources of the shared channel 320 to one or more UEs 115. The shared channel 320 may be an uplink shared channel (e.g., a PUSCH) or a downlink shared channel (e.g., a physical downlink shared channel (PDSCH)).

In some conventional techniques, a UE 115 may identify data to transmit and performs an SR procedure with a base station 105 to obtain resources within a shared channel. A problem with conventional techniques is that it may take too long to complete, and may not satisfy latency requirements of low latency communication systems (e.g., ultra-reliable low latency communication (URLLC) systems). Such conventional solutions to this problem may be deficient as they may be wasteful of shared channel resources, may have too many collisions within the shared channel resources, or both.

Figure 4:
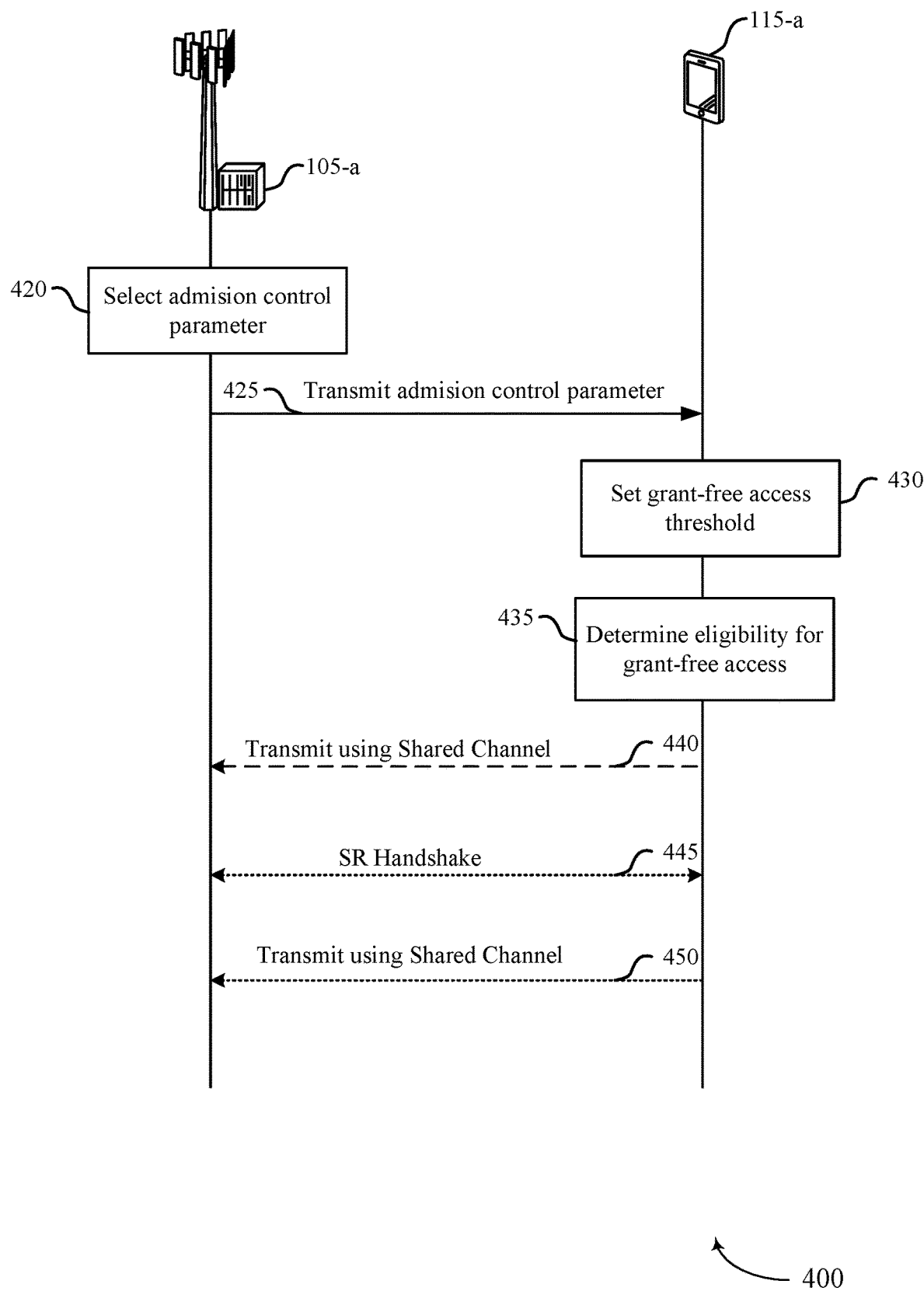
FIG. 4 illustrates an example of a process flowchart that supports grant-free admission control to a shared channel in accordance with aspects of the present disclosure.

The example admission control scheme described herein provides grant-free access to resources of a shared channel. For example, a base station 105 may monitors data collisions and adjust a grant-free access threshold to control which UEs are eligible for grant-free access to the shared channel resources. FIG. 4 illustrates an example of a process 400 that supports grant-free admission control to a shared channel in accordance with various aspects of the present disclosure. In process 400, a UE 115-a may have established a connection with a base station 105-a.

At 420, the base station 105-a may select an admission control parameter from a set of admission control parameters. The selected admission control parameter may set a grant-free access threshold, and the grant-free access threshold may control the eligibility the UE 115-a for grant-free access to resources of a shared channel 320.

The base station 105-a may monitor data collisions within resources of the shared channel 320 and may select and/or adjust the grant-free access threshold based on detected data collisions. In some examples, the base station 105-a may include a collision detector component 930, as further described in FIG. 9. The collision detector component 930 may monitor REs, RBs, carriers, or the like of the shared channel 320 for collisions. In one example, the collision detector component 930 may determine that a collision has occurred if the collision detector component 930 senses that an energy level of a particular carrier exceeds an energy threshold within a particular symbol period or set of symbol periods, but the base station 105-a is unable to successfully decode data from the symbol period(s). Sensing that the energy level exceeds the threshold in combination with being unable to successfully decode data from the symbol period(s) may indicate to the base station 105-a that multiple UEs 115 simultaneously transmitted using the same carrier during the same symbol period(s). The base station 105-a may thus determine that a collision occurred within the symbol period(s). The base station 105-a may determine a collision rate that is a function of the number of detected collisions within resources of the shared channel 320 within a defined amount of time (e.g., defined number of symbol periods, slots, subframes, frames, sub TTIs, TTIs, etc.).

The base station 105-a may select the admission control parameter as a function of the collision rate. The selected admission control parameter may set a grant-free access threshold for one or more UEs 115. The base station 105-a may adjust the admission control parameter to increase the grant-free access threshold when collisions within resources of the shared channel 320 are frequently detected, and to decrease the grant-free access threshold when collisions with the shared channel 320 are infrequently detected.

In an example, the admission control parameter may be a single bit. If the collision rate satisfies a threshold (e.g., is less than the threshold), the base station 105-a may select a first bit value for the admission control parameter (e.g., may set the bit value to '1'). The first bit value may correspond to a grant-free access threshold in which some or all UEs 115 are eligible for grant-free access to the resources of the shared channel 320. Any eligible UE 115 having data to transmit may transmit the data within the next (or subsequent) sub TTI that includes an uplink shared channel without first performing the SR procedure.

If the collision rate does not satisfy the threshold (e.g., meets or exceeds the threshold), the base station 105-a may select a second bit value for the admission control parameter (e.g., may set the bit value to '0'). The second bit value may correspond to a grant-free access threshold in which no UEs 115 are eligible for grant-free access to the resources of the shared channel 320. Thus, any UE 115 having data to transmit may not be provided grant-free access to transmit the data within the next sub TTI that includes an uplink shared channel, and instead may be required to first perform an SR procedure before transmitting. The base station 105-a may, for example, transmit a grant to the UE 115 in a group common control channel 315 of a sub TTI 310 that allocates resources of the shared channel within that sub TTI. The UE 115 may process the grant and then transmit within the allocated resources.

In another example, the admission control parameter may be two or more bits. The base station 105-a may select bit values for the admission control parameter based at least in part on a range in which a detected collision rate falls. In a 2-bit example, the base station 105-a may define multiple thresholds and select bit values to control which UEs 115 are eligible for grant-free access to the shared channel 320. For instance, if a current collision rate is less than a first threshold, the base station 105-a may select a bit value of '11' for the admission control parameter to indicate that any or all UEs 115 are eligible for grant-free access to resources of the shared channel 320. If a current collision rate meets or exceeds the first threshold but is less than a second threshold, the base station 105-a may select a bit value of '10' for the admission control parameter to indicate that a first subset of the UEs 115 are eligible for grant-free access to resources of the shared channel 320, but a second subset of the UEs 115 are ineligible. If a current collision rate meets or exceeds the second threshold but is less than a third threshold, the base station 105-a may select a bit value of '01' for the admission control parameter to indicate that only a subset of the first subset of UEs 115 are eligible for grant-free access to the shared channel 320. If a current collision rate meets or exceeds the third threshold, the base station 105-a may select a bit value of '00' for the admission control parameter to indicate that no UEs 115 are eligible for grant-free access to the shared channel 320.

In other examples, the base station 105-a may define any number of thresholds and may utilize any number of bits to indicate which UEs 115 are eligible for grant-free access to the shared channel 320. Further, the base station 105-a may select or adjust the admission control parameter over time, based on a detected collision rate, to provide fewer or no UEs with grant-free access to resources of the shared channel 320 when the collision rate is high, and provide some or all UEs with grant-free access to resources of the shared channel 320 when the collision rate is low.

In some examples, the admission control parameter may prevent access to or enable to one or more UEs to access only a portion of the resources of the shared channel 320. For example, the base station 105-a may allocate a portion of the resources of the shared channel 320 for grant free access within one or more sub TTIs 310, and the admission control parameter may control grant-free access to the portion.

At 425, the base station 105-a may transmit the selected admission control parameter to configure the UE 115-a with the grant-free access threshold. In some examples, the base station 105-a may signal the selected admission control parameter using one or more different communication layers. In one example, the base station 105-a may transmit the selected admission control parameter using layer one signaling, such as in a group common control channel 315. Additional aspects of layer one signaling are described below in FIG. 5. In another example, the base station 105-a may transmit the selected admission control parameter using layer two signaling, such as in a payload of a downlink shared channel. Additional aspects of layer two signaling are described below in FIG. 6. In another example, the base station 105-a may transmit the selected admission control parameter using layer three signaling, such as radio resource control (RRC) signaling. In an example, when using the RRC layer, the base station 105-a may transmit the selected admission control parameter in a RRC configuration request and may transmit adjustments to the admission control parameter in some or each RRC reconfiguration request. In such an example, the selected admission control parameter may be considered semi-static as the selected admission control parameter may remain the same for two or more sub TTIs.

At 430, the UE 115-a may set (e.g., store) the grant-free access threshold based at least in part on the admission control parameter received from the base station 105-a at 425. The UE 115-a may use the grant-free access threshold to determine eligibility of the UE 115-a for grant-free access to resources of the shared channel 320. For example, the UE 115-a may at 425 receive an admission control parameter having a bit value of '01', and may at 430 set a value of the grant-free access threshold to the same bit value (e.g., '01').

At 435, the UE 115-*a* may determine eligibility of the UE 115-*a* for grant-free access to the shared channel 320. For example, the UE 115-*a* may determine that it has uplink data to transmit to the base station 105-*a*, and may determine whether the UE 115-*a* is eligible for grant-free access to resources of the shared channel 320. In some examples, the base station 105-*a* may specify to UEs 115 a priority level, a service level, or both, to indicate which subset of the UEs 115 are eligible for grant-free access to the shared channel 320. In an example, the base station 105-*a* may select a priority level for each of the UEs 115 connected to the base station 105-*a* and may transmit a message (not shown in FIG. 4) informing each UE 115 of its priority level. A UE 115 may compare its priority level to the grant-free access threshold, or may generate a number as a function of its priority level for comparison to the grant-free access threshold, to determine whether the UE 115 is eligible for grant-free access to the shared channel 320.

For example, the access control parameter transmitted at 425 may be two bits, and the base station 105-*a* may set a priority level for each UE 115-*a* as one of '00', '01', '10', or '11'. The UE 115-*a* may compare its assigned priority level to the set value for the grant-free access threshold. In an example, UE 115-*a* has a priority level of '01', and the UE 115-*a* is eligible for grant-free access as long as its priority level meets or is below the grant-free access threshold. Thus, the UE 115-*a* having a priority level '01' is eligible to transmit for set values for the grant-free access threshold of '01', '10', or '11', but not '00'. In a second example, UE 115-*a* has a priority level of '10', and hence is eligible to transmit for set values for the grant-free access threshold of '10', or '11', but not '00' or '01'.

In another example, each UE 115 may negotiate for a particular service level (e.g., quality of service (QoS) level) when establishing a connection with the base station 105-*a*, and the base station 105-*a* may transmit the service level to each UE 115. A UE 115 may compare its service level to the grant-free access threshold, or may generate a number (e.g., a random or pseudo-random number) as a function of its service level for comparison to the grant-free access threshold, to determine whether the UE 115 is eligible for grant-free access to the shared channel 320. For example, the UE 115-*a* may have a service level of one of '00', '01', '10', or '11', or may generate a number having a value of one of '00', '01', '10', or '11' based on its service level, for comparison to the value set for the grant-free access threshold at 430, similar to the manner described above.

In another example, each UE 115 may generate a number (e.g., a random or pseudo-random number) that is used as its priority level, and may compare its priority level to the grant-free access threshold to determine whether the UE 115 is eligible for grant-free access to the shared channel 320. For example, the UE 115-*a* may generate a number that is one of '00', '01', '10', or '11' for comparison to the value set for the grant-free access threshold at 430, similar to the manner described above. The examples provided herein are 2-bit examples, but the techniques described herein may be extended to any number of bits.

Operation 440 of FIG. 4 corresponds to the UE 115-*a* determining at 435 that it is eligible for grant-free access to the shared channel 320, and operations 445 and 450 correspond to the UE 115-*a* determining at 435 that it is ineligible.

In some cases, the UE 115-*a* may at 435 determine that it is eligible for grant-free access and may at 440 transmit using resources of the shared channel 320 without first obtaining a grant from the base station 105-*a*. In some instances, the UE 115-*a* may transmit using all of the resources of the shared channel 320 within the next one or more sub TTIs 310. In another example, the UE 115-*a* may transmit using a portion of the shared channel 320 (e.g., selected symbol period(s), RE(s), REG(s), RB(s), one or more sub-carriers, etc.) within the next one or more sub TTIs 310.

In some cases, the UE 115-*a* may, at 435 determine that it is ineligible for grant-free access, and may at 445 perform the conventional SR procedure for obtaining a grant from the base station 105-*a*, as described above. As part of an SR handshake at 445, the base station 105-*a* may transmit a grant allocating resources of the shared channel 320 to the UE 115-*a* within an upcoming one or more sub TTIs 310. At 450, the UE 115-*a* may transmit using the shared channel 320 in the resources allocated in the grant.

The operations described in FIG. 4 may repeat one or more times. For example, the process flow chart 400 may return to 420 where the base station 105-*a* may monitor a collision rate within resources of the shared channel 320 and may transmit an adjustment to the admission control parameter at 425 to increase or decrease the grant-free access threshold.

Figure 5:
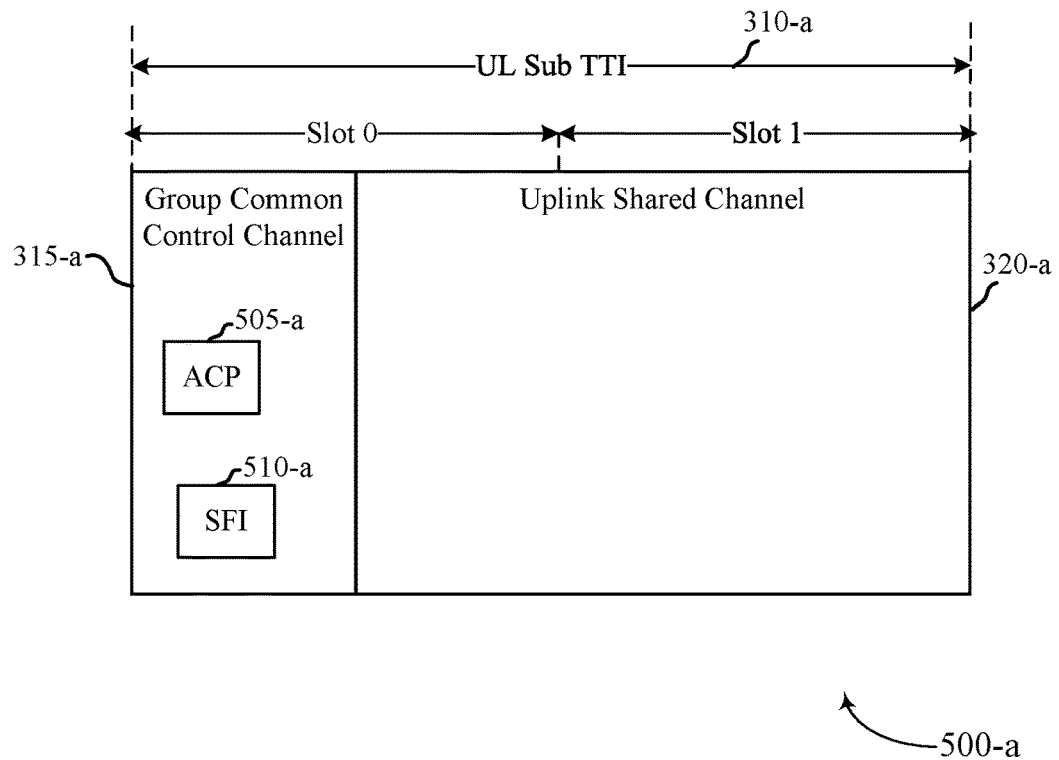
FIG. 5 illustrates an example of an uplink sub TTI that supports grant-free admission control to a shared channel in accordance with aspects of the present disclosure.
Figure 5:
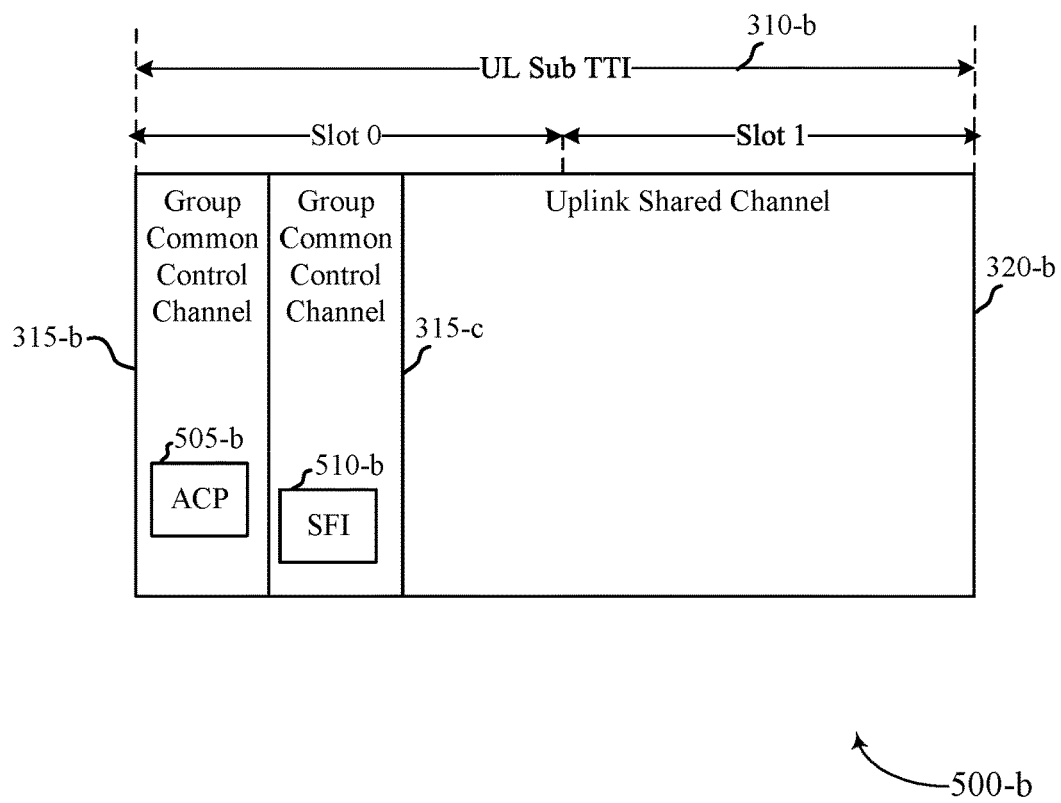

In some examples, the base station 105-*a* may use layer one signaling to send the selected admission control parameter to the UE 115-*a*. FIG. 5 illustrates example diagrams 500-*a*, 500-*b* of uplink sub TTIs 310 that support grant-free admission control for a shared channel in accordance with various aspects of the present disclosure. Uplink sub TTI 310-*a* of diagram 500-*a* is an example of a sub TTI 310 within TTI structure 300 of FIG. 3. The uplink sub TTI 310-*a* may include a group common control channel 315-*a* and an uplink shared channel 320-*a*. The base station 105-*a* may transmit the selected admission control parameter within the group common control channel 315-*a*. In an example, the base station 105-*a* may transmit an admission control parameter 505-*a* within time and frequency resources of the group common control channel 315-*a*, and the admission control parameter 505-*a* may apply to the uplink shared channel 320-*a* within the same sub TTI 310-*a*, but not to other sub TTIs 310-*a*. In other examples, the selected admission control parameter within a group common control channel 315-*a* of a particular sub TTI 310-*a* may apply to uplink shared channels 320-*a* within a different or multiple other (e.g., a preconfigured number of) sub TTIs 310-*a*.

In some examples, the group common control channel 315-*a* occurs within each uplink sub TTI 310-*a* of the TTI structure 300 (see FIG. 3), and the base station 105-*a* may adjust the selected admission control parameter to the UE 115-*a* on a sub TTI by sub TTI basis. Because the UE 115-*a* receives the selected admission control parameter before each uplink shared channel 320-*a*, the base station 105-*a* may dynamically control the admission control parameter of the group common control channel 315-*a* for the corresponding uplink shared channel 320-*a* within the same sub TTI 310-*a*.

In some examples, the base station 105-*a* may group-cast the admission control parameter by transmitting a single admission control parameter per group of UEs. For instance, multiple UEs may monitor the group common control channel 315-*a* and search for a same admission control parameter. The base station 105-*a* may assign a common address or identifier to a group of UEs 115 (e.g., UE 115-*a*, UE 115-*b*), and the UEs 115-*a*, 115-*b* within the group may use the common address or identifier to decode the group common control channel 315-*a* to obtain the admission control parameter. Each of the UEs 115-*a*, 115-*b* within the group may use the same admission control parameter for determining eligibility for grant-free access to the uplink shared channel 320-*a*. In some instances, this may result in collisions when multiple UEs 115-*a*, 115-*b* within the group attempt to transmit using the same resources of the uplink shared channel 320-*a*. As noted above, the base station 105-*a* may monitor the uplink shared channel 320-*a* for collisions and adjust the admission control parameter accordingly.

The base station 105-*a* may also monitor the detected collision rate to increase or reduce the number of UEs 115 in a particular group. The group common control channel 315-*a*, for example, may include UE-specific control information and a particular UE 115-*a* may use its address to decode resources of the channel 315-*a* to obtain the UE-specific control information. In some cases, the UE-specific control information may assign the UE to a different group and include a group address of the different group. The depicted group common control channel 315-*a* only depicts a single instance of an admission control parameter within the group common control channel 315-*a*, but may include two or more admission control parameters, one for each group of UEs 115, for individual UEs 115, or both.

In some examples, the base station 105-*a* may transmit the admission control parameter and a slot format indication (SFI) 510-*a* within the same group common control channel 315-*a*, as shown in diagram 500-*a*. The SFI 510-*a* may indicate a format of one or more slots (e.g., slot 0, slot 1) of the sub TTI 310-*a*. For example, the SFI 510-*a* may indicate a downlink format or an uplink format.

In other examples, the base station 105-*a* may transmit the admission control parameter and the SFI in different group common control channels, as shown in diagram 500-*b*. Uplink sub TTI 310-*b* is an example of a sub TTI 310 within TTI structure 300 of FIG. 3. The uplink sub TTI 310-*b* may include a first group common control channel 315-*b*, a second group common control channel 315-*c*, and an uplink shared channel 320-*a*. In the depicted example, an admission control parameter 505-*b* may be transported within time and frequency resources of the first group common control channel 315-*b*, and the SFI 510-*b* may be may be transported within time and frequency resources of the second group common control channel 315-*c*.

Figure 6:
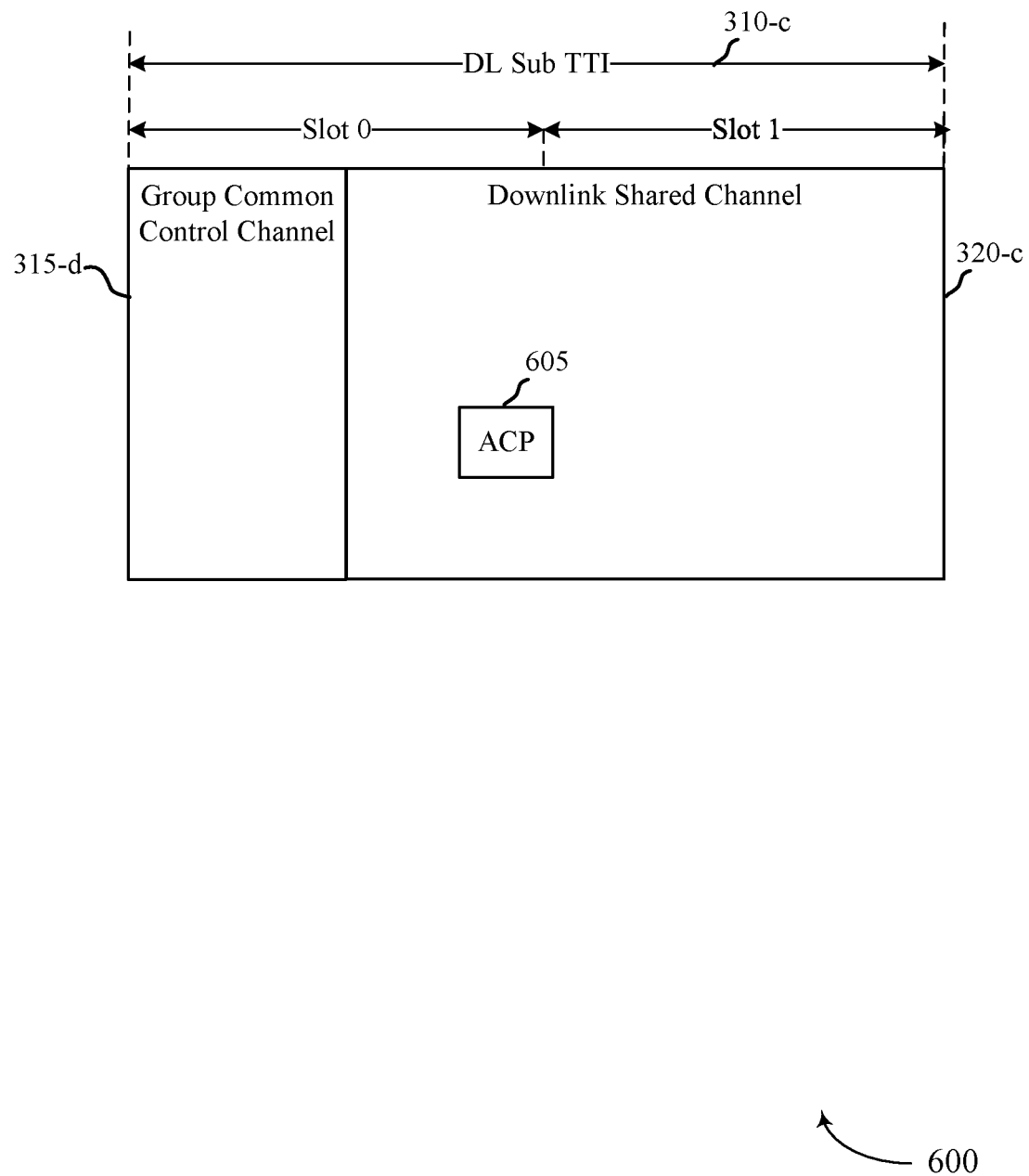
FIG. 6 illustrates an example of a downlink sub TTI that supports grant-free admission control to a shared channel in accordance with aspects of the present disclosure.

In some examples, the base station 105-*a* may use layer two signaling to send the selected admission control parameter to the UE 115-*a*. FIG. 6 illustrates an example diagram 600 of a downlink sub TTI 310-*c* that supports grant-free admission control for a shared channel in accordance with various aspects of the present disclosure. Downlink sub TTI 310-*c* is an example of a sub TTI 310 from TTI structure 300 of FIG. 3. The downlink sub TTI 310-*c* may include a group common control channel 315-*d* and a downlink shared channel 320-*c* (e.g., a PDSCH). In some cases, the base station 105-*a* may transmit the selected admission control parameter 605 within a payload of the downlink shared channel 320-*c*. The payload may be some or all of the time and frequency resources of the downlink shared channel 320-*c* that have been allocated for a downlink transmission to the UE 115-*a*. In some examples, the payload may include a media access control (MAC) control element (CE) that includes the selected admission control parameter 605. In another example, MAC-CA may be a unicast MAC-CE that includes the selected admission control parameter.

Advantageously, the examples described herein may provide grant-free access to resources of a shared channel. A base station may monitor a collision rate within resources of the shared channel. The base station may select and/or adjust an admission control parameter for setting a grant-free access threshold to control which UEs are eligible to transmit within the shared channel resources without first having to request a grant from the base station prior to transmitting.

Figure 7:
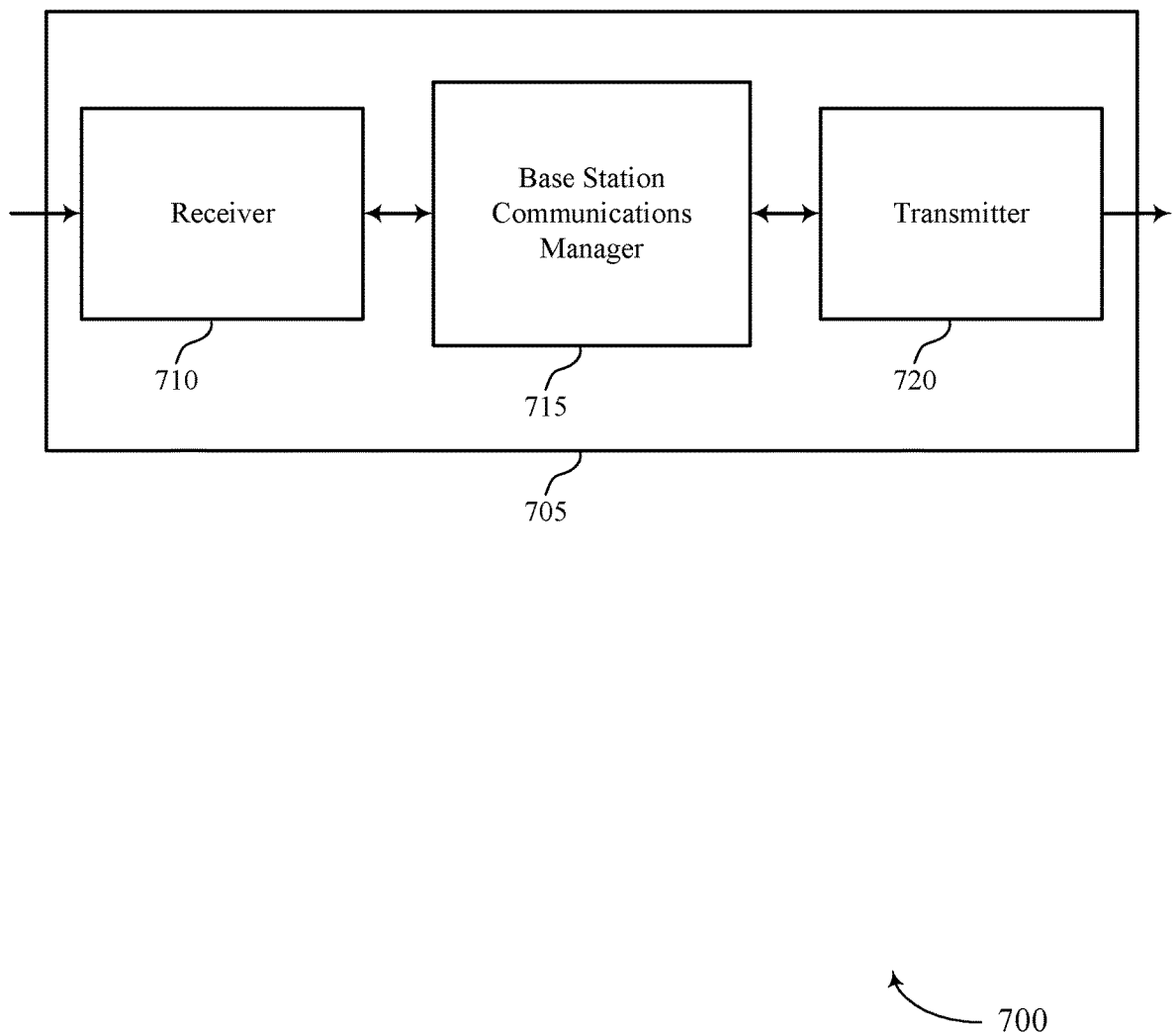
FIGS. 7 through 9 show block diagrams of a device that supports grant-free admission control to a shared channel in accordance with aspects of the present disclosure.

FIG. 7 shows a block diagram 700 of a wireless device 705 that supports grant-free admission control to a shared channel in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to grant-free admission control to a shared channel, etc.). Information may be passed on to other components of the device. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may select an admission control parameter from a set of admission control parameters, the selected admission control parameter setting a grant-free access threshold for determining eligibility to obtain grant-free access to resources of a shared channel and transmit the selected admission control parameter to configure a UE with the grant-free access threshold.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
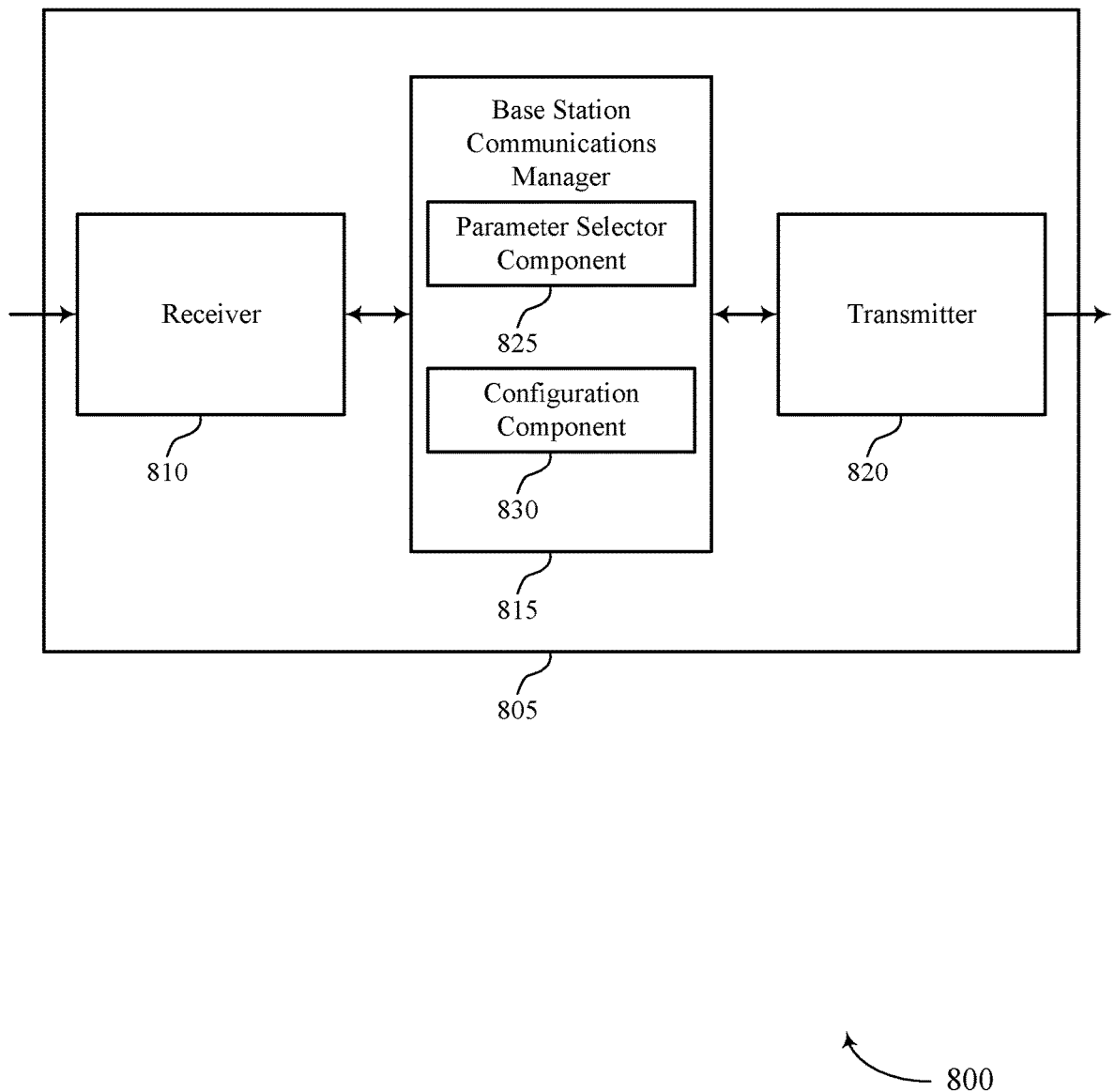

FIG. 8 shows a block diagram 800 of a wireless device 805 that supports grant-free admission control to a shared channel in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to grant-free admission control to a shared channel, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10.

Base station communications manager 815 may also include parameter selector component 825 and configuration component 830.

Parameter selector component 825 may select an admission control parameter from a set of admission control parameters, the selected admission control parameter setting a grant-free access threshold for determining eligibility to obtain grant-free access to resources of a shared channel. In some cases, the selected admission control parameter increases or decreases the grant-free access threshold. In some cases, the selected admission control parameter includes at least one bit. In some cases, the set of admission control parameters correspond to a set of different grant-free access thresholds. Parameter selector component 825 may adjust the admission control parameter based on a detected collision rate.

Configuration component 830 may transmit the selected admission control parameter to configure a UE with the grant-free access threshold. In some cases, the grant-free access threshold prevents the UE from accessing at least some of the resources of the shared channel. In some cases, the grant-free access threshold permits the UE to access at least some of the resources of the shared channel. In some cases, transmitting the selected admission control parameter further includes: transmitting the selected admission control parameter on a common control channel. In some cases, the common control channel is common to a group of UEs that includes the UE. In some cases, the selected admission control parameter configures each UE within the group of UEs with the grant-free access threshold. In some cases, transmitting the selected admission control parameter further includes: transmitting the selected admission control parameter in a common control channel transporting a slot format indication or in a different common control channel. In some cases, transmitting the selected admission control parameter further includes: transmitting the selected admission control parameter in a payload of a downlink shared channel. In some cases, transmitting the selected admission control parameter further includes: transmitting the selected admission control parameter using radio resource control signaling. In some cases, configuration component 830 may transmit an adjusted admission control parameter to configure the UE.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
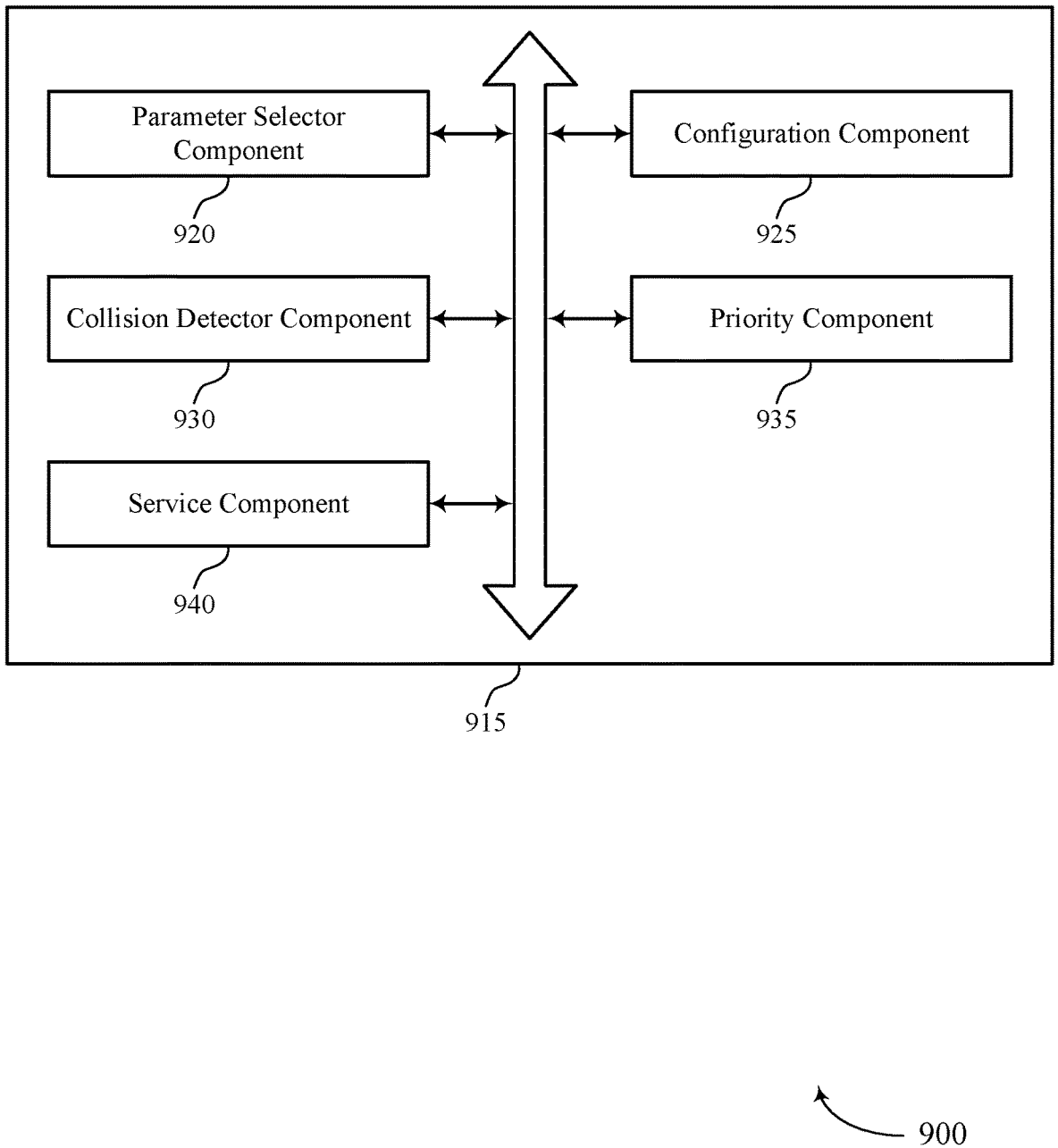

FIG. 9 shows a block diagram 900 of a base station communications manager 915 that supports grant-free admission control to a shared channel in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include parameter selector component 920, configuration component 925, collision detector component 930, priority component 935, and service component 940. Each of these modules may communicate, directly or indirectly, with one another (e.g., via one or more buses).

Parameter selector component 920 may select an admission control parameter from a set of admission control parameters, the selected admission control parameter setting a grant-free access threshold for determining eligibility to obtain grant-free access to resources of a shared channel. In some cases, the selected admission control parameter increases or decreases the grant-free access threshold. In some cases, the selected admission control parameter includes at least one bit. In some cases, the set of admission control parameters correspond to a set of different grant-free access thresholds. In some cases, parameter selector component 920 may adjust the admission control parameter based on a detected collision rate.

Configuration component 925 may transmit the selected admission control parameter to configure a UE with the grant-free access threshold. In some cases, the grant-free access threshold prevents the UE from accessing at least some of the resources of the shared channel. In some cases, the grant-free access threshold permits the UE to access at least some of the resources of the shared channel. In some cases, transmitting the selected admission control parameter further includes: transmitting the selected admission control parameter on a common control channel. In some cases, the common control channel is common to a group of UEs that includes the UE. In some cases, the selected admission control parameter configures each UE within the group of UEs with the grant-free access threshold. In some cases, transmitting the selected admission control parameter further includes: transmitting the selected admission control parameter in a common control channel transporting a slot format indication or in a different common control channel. In some cases, transmitting the selected admission control parameter further includes: transmitting the selected admission control parameter in a payload of a downlink shared channel. In some cases, transmitting the selected admission control parameter further includes: transmitting the selected admission control parameter using radio resource control signaling. In some cases, configuration component 925 may transmit an adjusted admission control parameter to configure the UE.

Collision detector component 930 may detect a collision rate within the resources of the shared channel. In some cases, detecting the collision rate includes: determining a rate at which an energy level within the resources of the shared channel exceeds an energy threshold. In some cases, the selected admission control parameter is based on the detected collision rate.

Priority component 935 may select a priority level of a set of priority levels for the UE and transmit the selected priority level to the UE.

Service component 940 may determine a service level of a set of service levels associated with the UE and transmit the determined service level to the UE.

Figure 10:
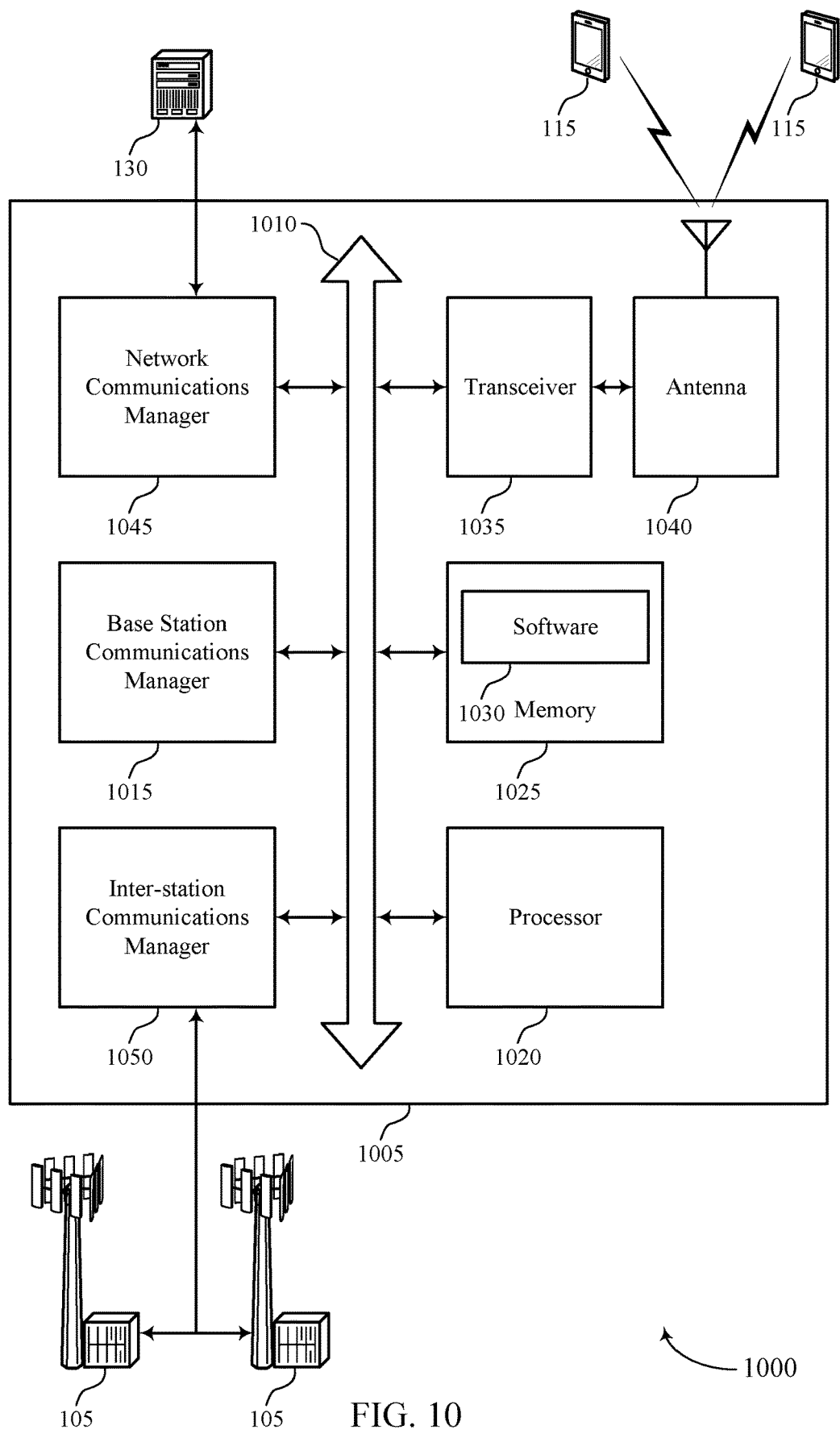
FIG. 10 illustrates a block diagram of a system including a base station that supports grant-free admission control to a shared channel in accordance with aspects of the present disclosure.

FIG. 10 shows a diagram of a system 1000 including a device 1005 that supports grant-free admission control to a shared channel in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting grant-free admission control to a shared channel).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support grant-free admission control to a shared channel. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
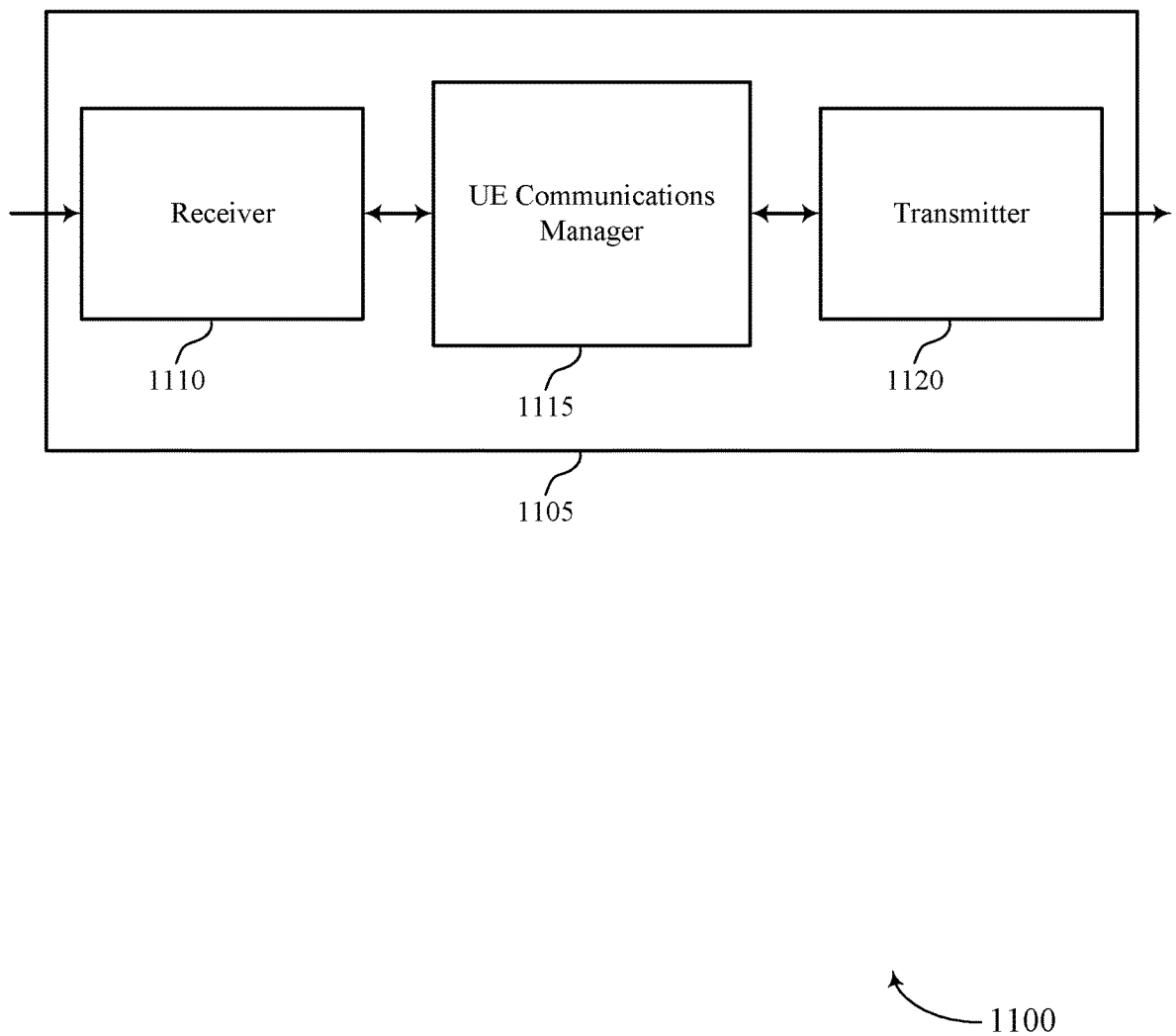
FIGS. 11 through 13 show block diagrams of a device that supports grant-free admission control to a shared channel in accordance with aspects of the present disclosure.

FIG. 11 shows a block diagram 1100 of a wireless device 1105 that supports grant-free admission control to a shared channel in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to grant-free admission control to a shared channel, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive an admission control parameter from a base station, set a grant-free access threshold based on the admission control parameter, determine eligibility to obtain grant-free access to resources of a shared channel based on the grant-free access threshold, and communicate with the base station based on the determined eligibility.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
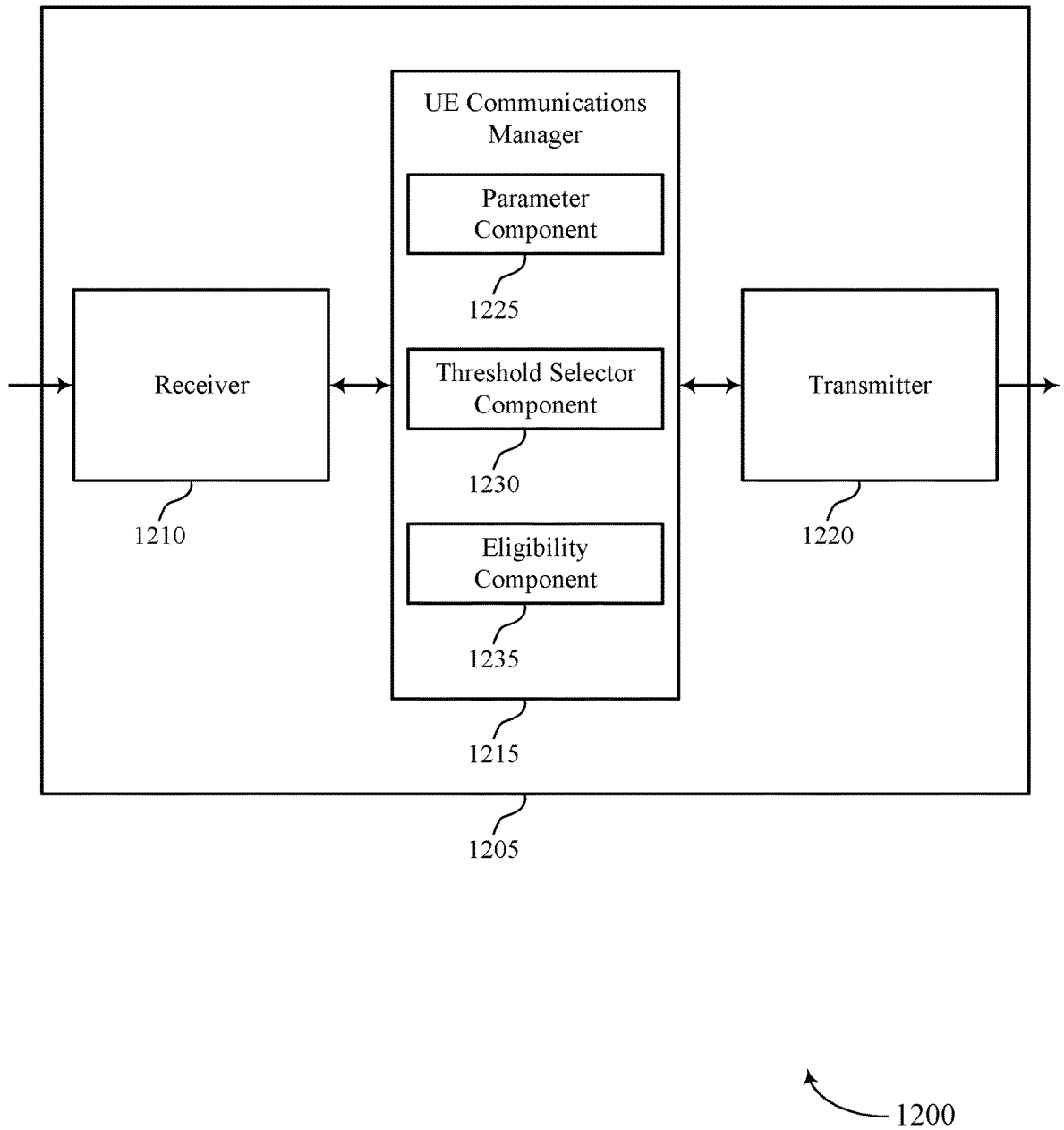

FIG. 12 shows a block diagram 1200 of a wireless device 1205 that supports grant-free admission control to a shared channel in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to grant-free admission control to a shared channel, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include parameter component 1225, threshold selector component 1230, and eligibility component 1235.

Parameter component 1225 may receive an admission control parameter from a base station.

Threshold selector component 1230 may set a grant-free access threshold based on the admission control parameter.

Eligibility component 1235 may determine eligibility to obtain grant-free access to resources of a shared channel based on the grant-free access threshold and communicate with the base station based on the determined eligibility.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
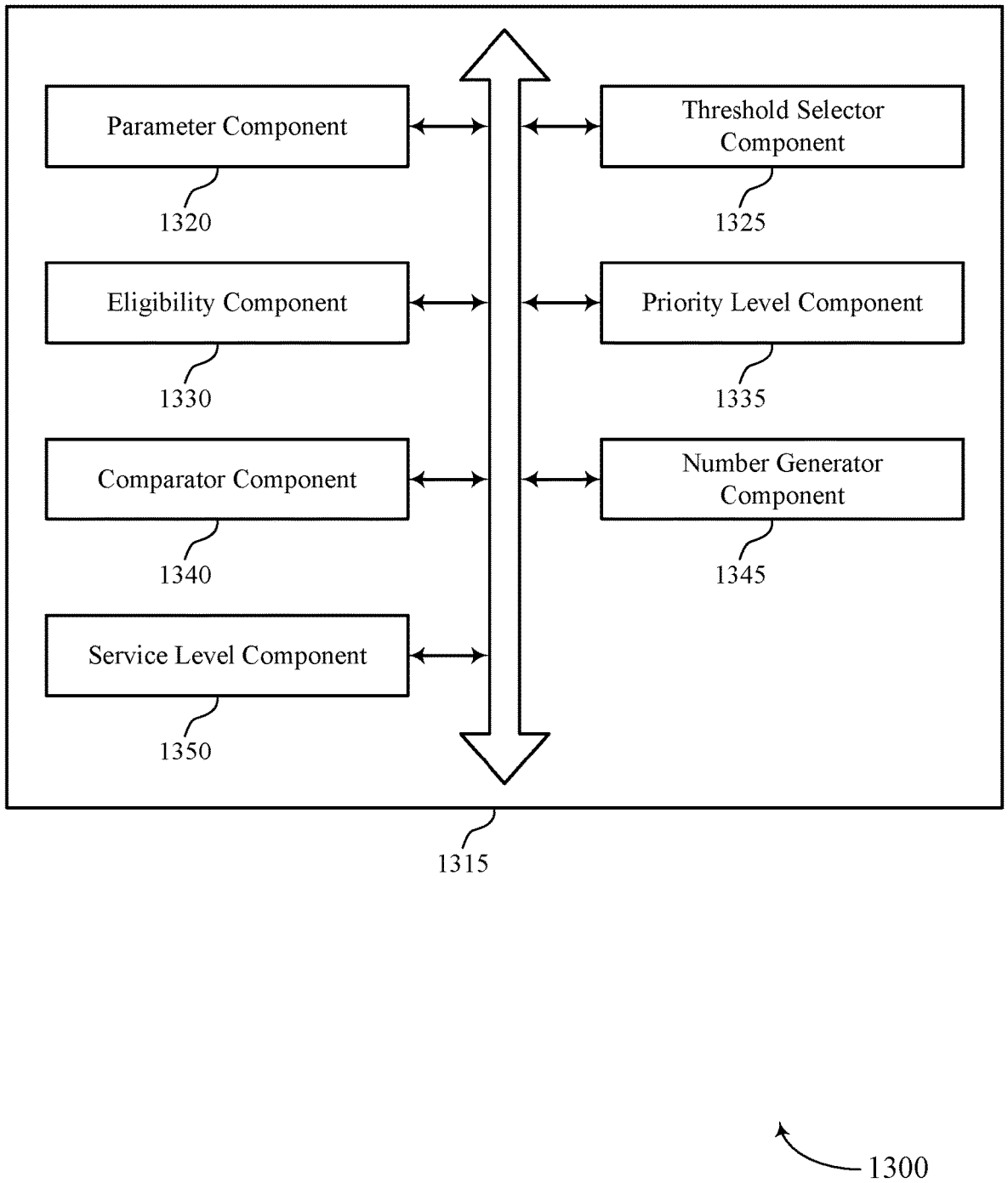

FIG. 13 shows a block diagram 1300 of a UE communications manager 1315 that supports grant-free admission control to a shared channel in accordance with aspects of the present disclosure. The UE communications manager 1315 may be an example of aspects of a UE communications manager 1415 described with reference to FIGS. 11, 12, and 14. The UE communications manager 1315 may include parameter component 1320, threshold selector component 1325, eligibility component 1330, priority level component 1335, comparator component 1340, number generator component 1345, and service level component 1350. Each of these modules may communicate, directly or indirectly, with one another (e.g., via one or more buses).

Parameter component 1320 may receive an admission control parameter from a base station.

Threshold selector component 1325 may set a grant-free access threshold based on the admission control parameter.

Eligibility component 1330 may determine eligibility to obtain grant-free access to resources of a shared channel based on the grant-free access threshold and communicate with the base station based on the determined eligibility.

Priority level component 1335 may receive a priority level of a set of priority levels from the base station.

Comparator component 1340 may compare the priority level with the grant-free access threshold and compare the random number with the grant-free access threshold.

Number generator component 1345 may generate the random number based on the determined service level. In some cases, determining eligibility to obtain grant-free access to the resources of the shared channel includes: determining a random number.

Service level component 1350 may determine a service level of a set of service levels.

Figure 14:
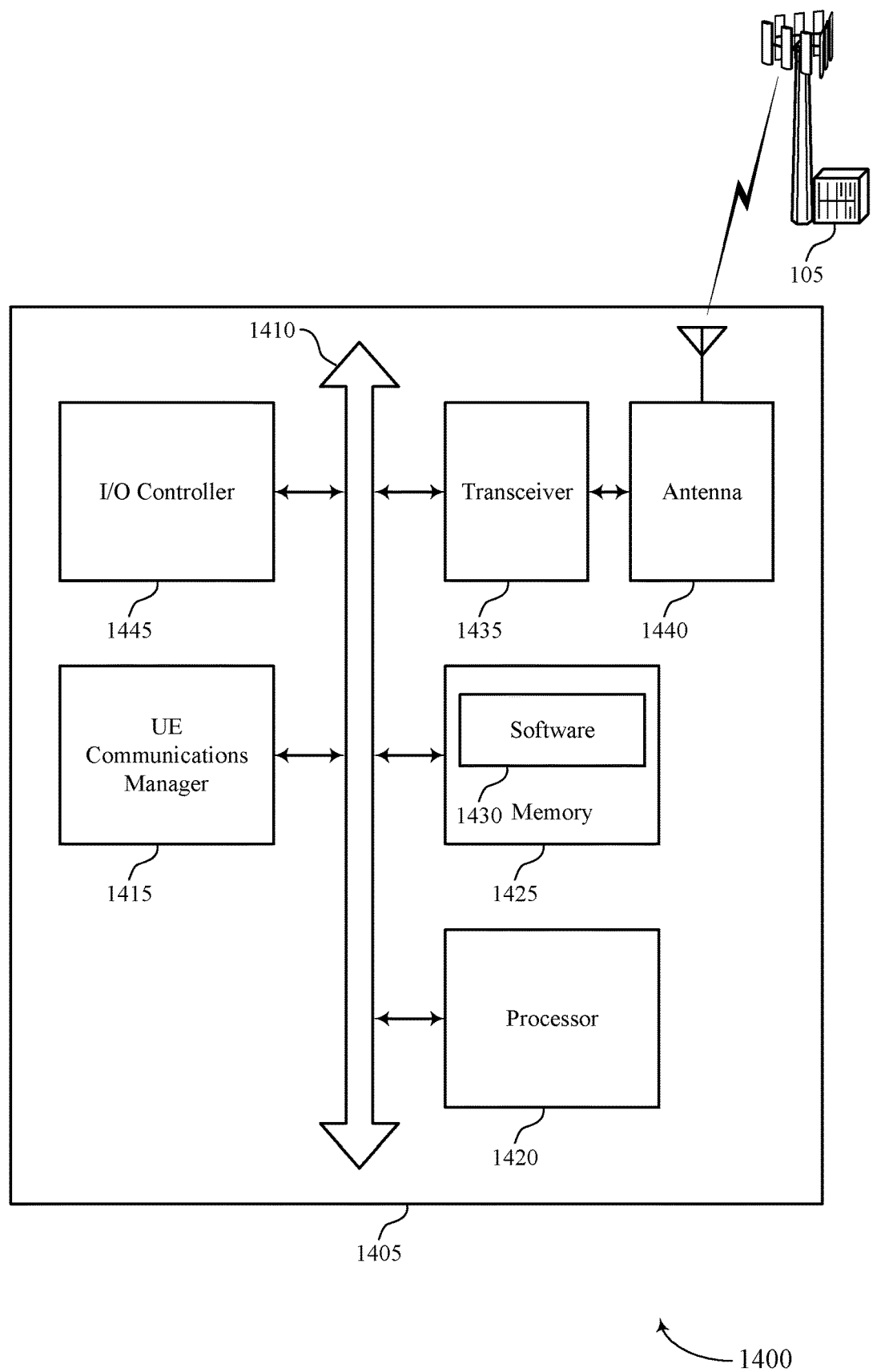
FIG. 14 illustrates a block diagram of a system including a UE that supports grant-free admission control to a shared channel in accordance with aspects of the present disclosure.

FIG. 14 shows a diagram of a system 1400 including a device 1405 that supports grant-free admission control to a shared channel in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting grant-free admission control to a shared channel).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support grant-free admission control to a shared channel. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
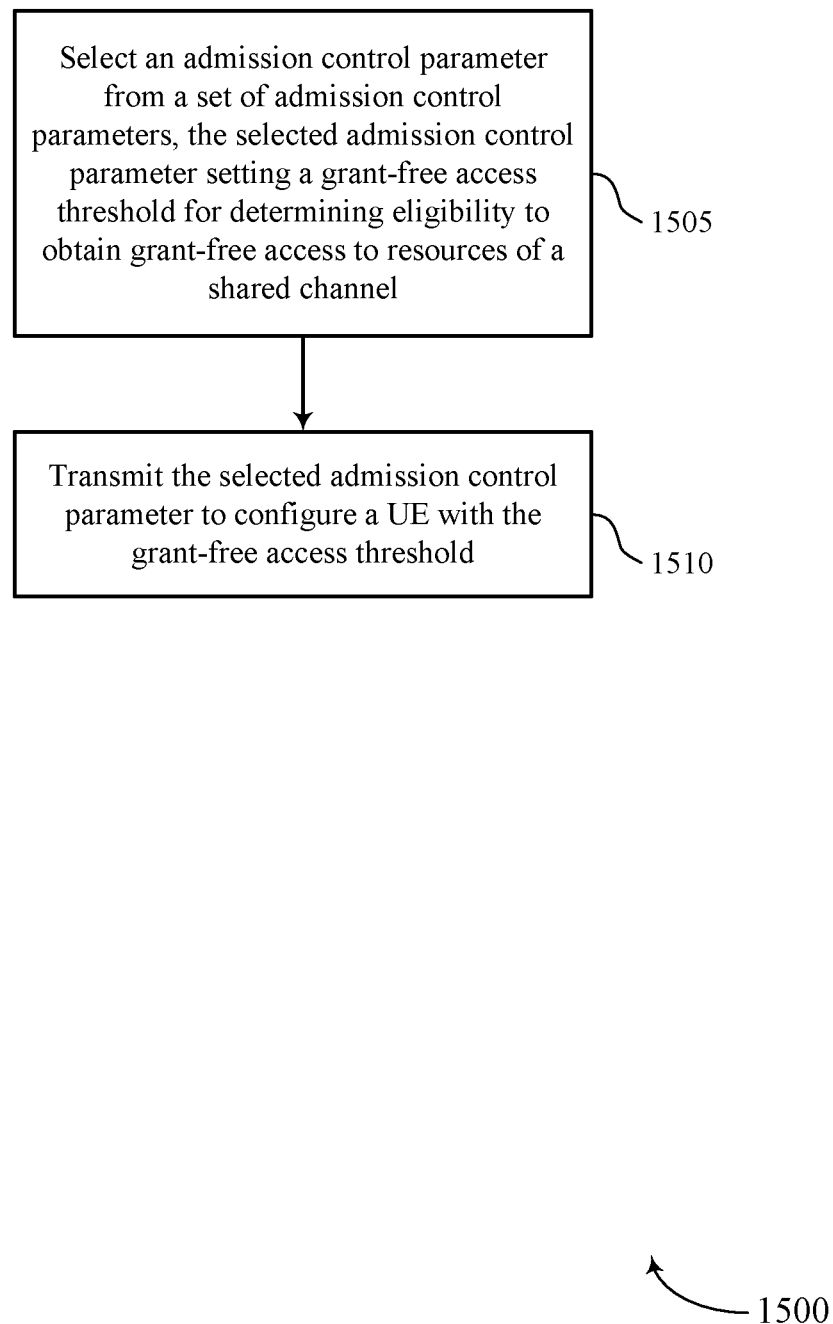
FIGS. 15 through 18 illustrate methods for grant-free admission control to a shared channel in accordance with aspects of the present disclosure.

FIG. 15 shows a flowchart illustrating a method 1500 for grant-free admission control to a shared channel in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may select an admission control parameter from a plurality of admission control parameters, the selected admission control parameter setting a grant-free access threshold for determining eligibility to obtain grant-free access to resources of a shared channel. The operations of block 1505 may be performed according to the methods described herein. In certain examples, aspects of the operations of block 1505 may be performed by a parameter selector component as described with reference to FIGS. 7 through 10.

At block 1510 the base station 105 may transmit the selected admission control parameter to configure a UE with the grant-free access threshold. The operations of block 1510 may be performed according to the methods described herein. In certain examples, aspects of the operations of block 1510 may be performed by a configuration component as described with reference to FIGS. 7 through 10.

Figure 16:
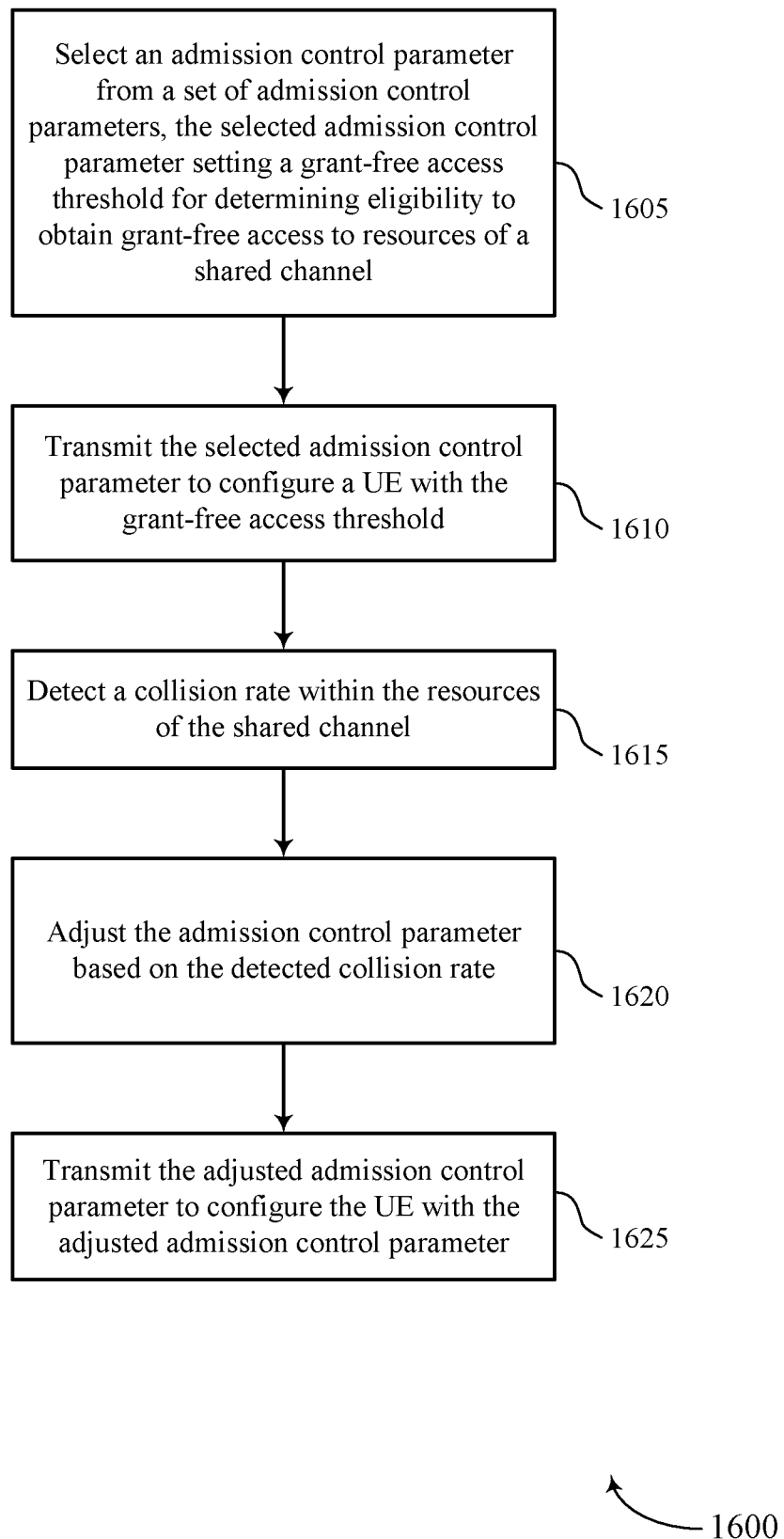

FIG. 16 shows a flowchart illustrating a method 1600 for grant-free admission control to a shared channel in accordance with aspects of the present disclosure. The operations of method 1600 may be implemented by a base station 105 or its components as described herein. For example, the operations of method 1600 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may select an admission control parameter from a plurality of admission control parameters, the selected admission control parameter setting a grant-free access threshold for determining eligibility to obtain grant-free access to resources of a shared channel. The operations of block 1605 may be performed according to the methods described herein. In certain examples, aspects of the operations of block 1605 may be performed by a parameter selector component as described with reference to FIGS. 7 through 10.

At block 1610 the base station 105 may transmit the selected admission control parameter to configure a UE with the grant-free access threshold. The operations of block 1610 may be performed according to the methods described herein. In certain examples, aspects of the operations of block 1610 may be performed by a configuration component as described with reference to FIGS. 7 through 10.

At block 1615 the base station 105 may detect a collision rate within the resources of the shared channel. The operations of block 1615 may be performed according to the methods described herein. In certain examples, aspects of the operations of block 1615 may be performed by a collision detector component as described with reference to FIGS. 7 through 10.

At block 1620 the base station 105 may adjust the admission control parameter based at least in part on the detected collision rate. The operations of block 1620 may be performed according to the methods described herein. In certain examples, aspects of the operations of block 1620 may be performed by a parameter selector component as described with reference to FIGS. 7 through 10.

At block 1625 the base station 105 may transmit the adjusted admission control parameter to configure the UE with the adjusted admission control parameter. The operations of block 1625 may be performed according to the methods described herein. In certain examples, aspects of the operations of block 1625 may be performed by a configuration component as described with reference to FIGS. 7 through 10.

Figure 17:
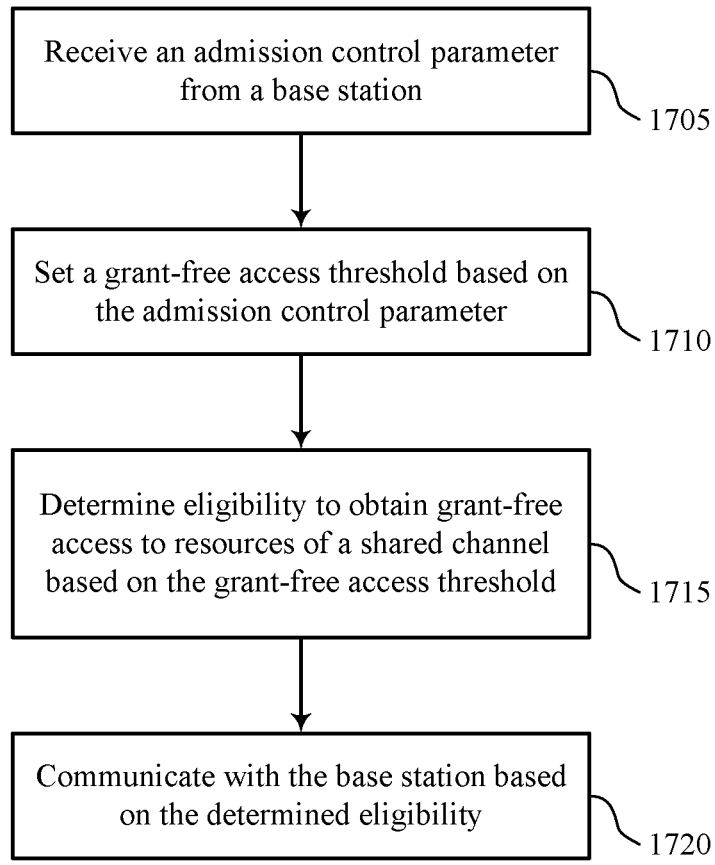

FIG. 17 shows a flowchart illustrating a method 1700 for grant-free admission control to a shared channel in accordance with aspects of the present disclosure. The operations of method 1700 may be implemented by a UE 115 or its components as described herein. For example, the operations of method 1700 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive an admission control parameter from a base station. The operations of block 1705 may be performed according to the methods described herein. In certain examples, aspects of the operations of block 1705 may be performed by a parameter component as described with reference to FIGS. 11 through 14.

At block 1710 the UE 115 may set a grant-free access threshold based at least in part on the admission control parameter. The operations of block 1710 may be performed according to the methods described herein. In certain examples, aspects of the operations of block 1710 may be performed by a threshold selector component as described with reference to FIGS. 11 through 14.

At block 1715 the UE 115 may determine eligibility to obtain grant-free access to resources of a shared channel based at least in part on the grant-free access threshold. The operations of block 1715 may be performed according to the methods described herein. In certain examples, aspects of the operations of block 1715 may be performed by a eligibility component as described with reference to FIGS. 11 through 14.

At block 1720 the UE 115 may communicate with the base station based at least in part on the determined eligibility. The operations of block 1720 may be performed according to the methods described herein. In certain examples, aspects of the operations of block 1720 may be performed by a eligibility component as described with reference to FIGS. 11 through 14.

Figure 18:
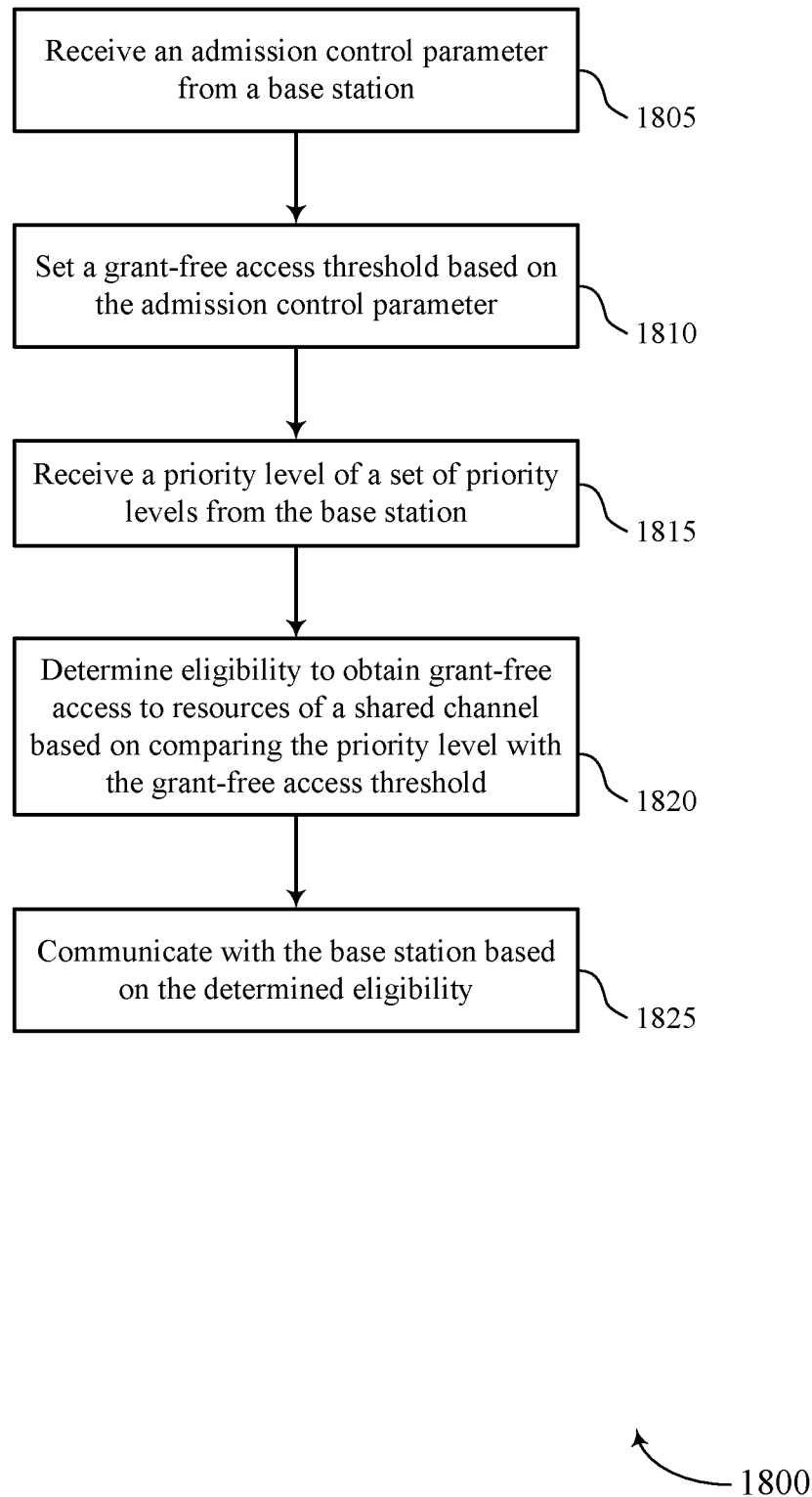

FIG. 18 shows a flowchart illustrating a method 1800 for grant-free admission control to a shared channel in accordance with aspects of the present disclosure. The operations of method 1800 may be implemented by a UE 115 or its components as described herein. For example, the operations of method 1800 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive an admission control parameter from a base station. The operations of block 1805 may be performed according to the methods described herein. In certain examples, aspects of the operations of block 1805 may be performed by a parameter component as described with reference to FIGS. 11 through 14.

At block 1810 the UE 115 may set a grant-free access threshold based at least in part on the admission control parameter. The operations of block 1810 may be performed according to the methods described herein. In certain examples, aspects of the operations of block 1810 may be performed by a threshold selector component as described with reference to FIGS. 11 through 14.

At block 1815 the UE 115 may receive a priority level of a plurality of priority levels from the base station. The operations of block 1815 may be performed according to the methods described herein. In certain examples, aspects of the operations of block 1815 may be performed by a eligibility component, a comparator component, or both, as described with reference to FIGS. 11 through 14.

At block 1820 the UE 115 may determine eligibility to obtain grant-free access to resources of a shared channel based at least in part on comparing the priority level to the grant-free access threshold. The operations of block 1820 may be performed according to the methods described herein. In certain examples, aspects of the operations of block 1820 may be performed by a eligibility component, a comparator component, or both, as described with reference to FIGS. 11 through 14.

At block 1825 the UE 115 may communicate with the base station based at least in part on the determined eligibility. The operations of block 1825 may be performed according to the methods described herein. In certain examples, aspects of the operations of block 1825 may be performed by a eligibility component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    transmitting a priority level to a user equipment (UE), the priority level associated with an eligibility of the UE to obtain grant-free access to resources of a shared channel;
    selecting an admission control parameter from a plurality of admission control parameters based at least in part on a collision rate within the resources of the shared channel, wherein the selected admission control parameter corresponds to the eligibility of the UE to obtain grant-free access to the resources of the shared channel;
    transmitting the selected admission control parameter to configure the UE with the selected admission control parameter; and
    communicating with one or more UEs over the shared channel based at least in part on the priority indication and the selected admission control parameter.

2. The method of claim 1, wherein selecting the admission control parameter comprises:
    detecting the collision rate within the resources of the shared channel, wherein the selected admission control parameter is based at least in part on the detected collision rate.

3. The method of claim 2, wherein detecting the collision rate comprises:
    determining a rate at which an energy level within the resources of the shared channel exceeds an energy threshold.

4. The method of claim 1, further comprising:
    detecting the collision rate within the resources of the shared channel;
    adjusting the admission control parameter based at least in part on the detected collision rate; and
    transmitting the adjusted admission control parameter to configure the UE with the adjusted admission control parameter.

5. The method of claim 1, wherein:
    the selected admission control parameter increases or decreases a quantity of UEs that are eligible to obtain grant-free access to the resources of the shared channel.

6. The method of claim 1, wherein:
    the selected admission control parameter prevents the UE from accessing at least some of the resources of the shared channel.

7. The method of claim 1, wherein:
    the selected admission control parameter permits the UE to access at least some of the resources of the shared channel.

8. The method of claim 1, wherein transmitting the selected admission control parameter further comprises:
    transmitting the selected admission control parameter on a common control channel.

9. The method of claim 8, wherein:
    the common control channel is common to a group of UEs that includes the UE.

10. The method of claim 9, wherein:
    the selected admission control parameter configures each UE within the group of UEs with the selected admission control parameter.

11. The method of claim 1, wherein transmitting the selected admission control parameter further comprises:
    transmitting the selected admission control parameter in a common control channel transporting a slot format indication or in a different common control channel.

12. The method of claim 1, wherein transmitting the selected admission control parameter further comprises:
    transmitting the selected admission control parameter in a payload of a downlink shared channel.

13. The method of claim 1, wherein transmitting the selected admission control parameter further comprises:
    transmitting the selected admission control parameter using radio resource control signaling.

14. The method of claim 1, wherein:
    the selected admission control parameter comprises at least one bit.

15. The method of claim 1, wherein:
    the plurality of admission control parameters correspond to a plurality of different groups of UEs being eligible to obtain grant-free access to the resources of the shared channel.

16. The method of claim 1, further comprising:
    selecting the priority level for the UE from a plurality of priority levels; and
    transmitting the selected priority level to the UE, wherein a combination of the selected admission control parameter and the selected priority level controls the eligibility of the UE to obtain grant-free access to the resources of the shared channel.

17. The method of claim 1, further comprising:
    determining a service level for the UE from a plurality of service levels; and
    transmitting the determined service level to the UE, wherein a combination of the selected admission control parameter and the determined service level controls the eligibility of the UE to obtain grant-free access to the resources of the shared channel.

18. A method for wireless communication, comprising:
    receiving, at a user equipment (UE), an admission control parameter from a base station;
    receiving, from the base station, a priority level for the UE;
    determining an eligibility of the UE to obtain grant-free access to resources of a shared channel based at least in part on a comparison of the priority level and the admission control parameter; and
    communicating with the base station based at least in part on the determined eligibility.

19. The method of claim 18, wherein determining the eligibility of the UE to obtain grant-free access to the resources of the shared channel comprises:
    determining a random number; and
    comparing the random number with the admission control parameter, wherein the eligibility of the UE is based at least in part on the comparing.

20. The method of claim 19, wherein determining the random number comprises:
    determining a service level of a plurality of service levels; and
    generating the random number based at least in part on the determined service level.

21. An apparatus for wireless communication, comprising:
a processor;
memory in electronic communication with the processor; and
instructions stored in the memory and operable, when executed by the processor, to cause the apparatus to:
transmit a priority level to a user equipment (UE), the priority level associated with an eligibility of the UE to obtain grant-free access to resources of a shared channel;
select an admission control parameter from a plurality of admission control parameters based at least in part on a collision rate within the resources of the shared channel, wherein the selected admission control parameter corresponds to the eligibility of the UE to obtain grant-free access to the resources of the shared channel;
transmit the selected admission control parameter to configure the UE with the selected admission control parameter; and
communicate with one or more UEs over the shared channel based at least in part on the priority indication and the admission control parameter.

22. The apparatus of claim 21, wherein selecting the admission control parameter comprises instructions further executable by the processor to:
detect the collision rate within the resources of the shared channel, wherein the selected admission control parameter is based at least in part on the detected collision rate.

23. The apparatus of claim 21, wherein the instructions are further executable by the processor to:
detect the collision rate within the resources of the shared channel;
adjust the admission control parameter based at least in part on the detected collision rate; and
transmit the adjusted admission control parameter to configure the UE with the adjusted admission control parameter.

24. The apparatus of claim 21, wherein:
the selected admission control parameter prevents the UE from accessing at least some of the resources of the shared channel.

25. The apparatus of claim 21, wherein:
the selected admission control parameter permits the UE to access at least some of the resources of the shared channel.

26. The apparatus of claim 21, wherein the instructions are further executable by the processor to:
select the priority level for the UE from a plurality of priority levels; and
transmit the selected priority level to the UE, wherein a combination of the selected admission control parameter and the selected priority level controls the eligibility of the UE to obtain grant-free access to the resources of the shared channel.

27. The apparatus of claim 21, wherein the instructions are further executable by the processor to:
determine a service level for the UE from a plurality of service levels; and
transmit the determined service level to the UE, wherein a combination of the selected admission control parameter and the determined service level controls the eligibility of the UE to obtain grant-free access to the resources of the shared channel.

28. An apparatus for wireless communication, comprising:
a processor;
memory in electronic communication with the processor; and
instructions stored in the memory and operable, when executed by the processor, to cause the apparatus to:
receive, at a user equipment (UE), an admission control parameter from a base station;
receive, from the base station, a priority level for the UE;
determine an eligibility of the UE to obtain grant-free access to resources of a shared channel based at least in part on a comparison of the priority level and the admission control parameter; and
communicate with the base station based at least in part on the determined eligibility.

* * * * *